(12) United States Patent
Woo et al.

(10) Patent No.: US 7,473,091 B2
(45) Date of Patent: Jan. 6, 2009

(54) APPARATUS FOR MANUFACTURING MEGAPIXEL MULTI-FOCUS LENS

(75) Inventors: Myung Sung Woo, Kyoungsangnam-do (KR); Dong Yeon Jung, Kyoungsangnam-do (KR); Sung Ho Han, Kyoungsangnam-do (KR); Yun Hyng Lee, Kyoungsangnam-do (KR); Jung Hyun Park, Kyoungsangnam-do (KR)

(73) Assignee: AEHO Technology Co., Ltd., Kyoungsangnam-Do (KR)

( * ) Notice: Subject to any disclaimer, the term of this patent is extended or adjusted under 35 U.S.C. 154(b) by 0 days.

(21) Appl. No.: 11/726,704

(22) Filed: Mar. 22, 2007

(65) Prior Publication Data

US 2008/0031990 A1    Feb. 7, 2008

(30) Foreign Application Priority Data

Jun. 15, 2006    (KR) .................. 20-2006-0016121 U
Jun. 15, 2006    (KR) .................. 20-2006-0016124 U

(51) Int. Cl.
*B29C 43/36*    (2006.01)
(52) U.S. Cl. ...................... 425/407; 425/808; 425/406; 425/422
(58) Field of Classification Search .................. 425/808, 425/403.1, 406, 407, 422, 453, 150, DIG. 127, 425/443, 441, 3, 149; 65/102, 305, 64, 319, 65/29.11; 264/320, 322, 2.2
See application file for complete search history.

(56) References Cited

U.S. PATENT DOCUMENTS

| | | | | |
|---|---|---|---|---|
| 5,188,652 | A | * | 2/1993 | Nakamura et al. ............. 65/319 |
| 5,514,311 | A | * | 5/1996 | Shimizu et al. ............. 264/40.1 |
| 6,592,785 | B1 | * | 7/2003 | Mukasa ....................... 264/2.2 |
| 2006/0032273 | A1 | * | 2/2006 | Wang ........................... 65/319 |

FOREIGN PATENT DOCUMENTS

EP    0733598    *    9/1996

* cited by examiner

*Primary Examiner*—Jeff Aftergut
*Assistant Examiner*—Jaeyun Lee
(74) *Attorney, Agent, or Firm*—Ladas and Parry LLP

(57) ABSTRACT

Disclosed herein is an apparatus for manufacturing a megapixel multi-focus lens. The lens manufacturing apparatus of the present invention includes a loading means for supplying a mold body, in which a blank, interposed between upper and lower molds, is placed, to a forming position, a compression-forming means, which preheats, compresses and cools the supplied mold body such that the blank is formed into a multi-focus lens having an aspherical surface, and a discharge means, which discharges the multi-focus lens formed by the compression-forming means. Therefore, processes from loading to discharging can be automated, so that the productivity of the apparatus for manufacturing the multi-focus lens can be markedly enhanced. Furthermore, because the lens manufacturing apparatus is covered with a cabinet, a superior appearance thereof is ensured. In addition, because various electric components for controlling the compression-forming means are provided in the cabinet, it is not necessary to separately install electrical control parts for mechanical parts.

11 Claims, 21 Drawing Sheets

APPARATUS FOR MANUFACTURING MEGAPIXEL MULTI-FOCUS LENS

BACKGROUND OF THE INVENTION

1. Field of the Invention

The present invention relates generally to apparatuses for manufacturing megapixel multi-focus lenses and, more particularly, to an apparatus for manufacturing a megapixel multi-focus lens, in which processes from loading a mold body to discharging the mold body are automated, so that the productivity of the lens manufacturing apparatus can be markedly enhanced, and, because the lens manufacturing apparatus is covered with a cabinet, a superior appearance thereof is ensured, and various electric components for controlling a compression-forming means are provided in the cabinet, so that it is not required to separate electrical control parts from mechanical parts, and in which, during the multi-focus lens manufacturing process, when a carrying arm moves the mold body to the subsequent processing position, because the carrying arm is brought into line contact with the sidewall of the mold body, heat dissipation holes, which are formed through the sidewall of the mold body, are prevented from being closed, thus enhancing the lens formation ability of the lens manufacturing apparatus, and in which the initial position of the carrying arm can be minutely and precisely adjusted depending on the size of the mold body, and, because a heat blocking plate is provided on the front surface of a forming chamber, the high heat in the forming chamber is prevented from radiating outside, thus the productivity of a worker can be enhanced.

2. Description of the Related Art

As well known to those skilled in the art, megapixel multi-focus lenses, which have aspherical surfaces and thus increase the transmissibility and refractivity thereof, are very important parts in optical modules and make it possible to increase the quality and reduce the size of the optical modules.

Such megapixel multi-focus lenses are widely applied to megapixel cellular phones, cameras, CD and DVD players, laser printers, projectors, etc., and are used as indispensable parts to determine the performance of the product.

The megapixel multi-focus lenses are classified into plastic megapixel multi-focus lenses and glass megapixel multi-focus lenses. Because the plastic megapixel multi-focus lens has resolution power less than that of the glass megapixel multi-focus lens, the use of the plastic megapixel multi-focus lens is on a decreasing trend.

Meanwhile, the megapixel multi-focus lenses are manufactured by a separate lens manufacturing apparatus. A conventional lens manufacturing apparatus is problematic in that the speed at which a lens is manufactured is relatively low, and the proportion of defective products is relatively high, so that the productivity of the lens manufacturing apparatus is reduced.

SUMMARY OF THE INVENTION

Accordingly, the present invention has been made keeping in mind the above problems occurring in the prior art, and an object of the present invention is to provide an apparatus for manufacturing a megapixel multi-focus lens which includes a loading means for supplying a mold body, in which a blank interposed between upper and lower molds is placed, to a forming position, a compression-forming means, which preheats, compresses and cools the supplied mold body such that the blank is formed into a multi-focus lens having an aspherical surface, and a discharge means, which discharges the multi-focus lens formed by the compression-forming means, so that processes from loading to discharging can be automated, thus the productivity of the apparatus for manufacturing the multi-focus lens can be markedly enhanced, and in which, because the lens manufacturing apparatus is covered with a cabinet, a superior appearance thereof is ensured, and, because various electric components for controlling the compression-forming means are provided in the cabinet, it is not required to separate electrical control parts from mechanical parts.

In order to accomplish the above object, the present invention provides an apparatus for manufacturing a megapixel multi-focus lens, including: a loading means, having an input conveyor to supply a mold body, in which a blank, interposed between upper and lower molds, is placed, to a loading plate, and a loading bar to supply the mold body, supplied to the loading plate, to a forming position; a compression-forming means, having first through third preheating units to preheat the mold body to a predetermined temperature, a compressing unit to compress the preheated mold body at a preset pressure, and first through third cooling units to cool the compressed mold body through a plurality of steps, the first through third preheating units, the compressing unit and the first through third cooling units being consecutively arranged in a line in a forming chamber and respectively preheating, compressing and cooling the mold body in the forming chamber filled with nitrogen gas so that the blank is formed into a multi-focus lens having an aspherical surface; a position moving means for moving the mold body to a subsequent processing position in the forming chamber; and a discharge means, having a discharge conveyor to discharge the multi-focus lens formed by the compression-forming means.

BRIEF DESCRIPTION OF THE DRAWINGS

The above and other objects, features and advantages of the present invention will be more clearly understood from the following detailed description taken in conjunction with the accompanying drawings, in which:

FIG. 10b is a bottom view showing the position moving means of FIG. 10a;

DESCRIPTION OF THE PREFERRED EMBODIMENTS

Hereinafter, a preferred embodiment of the present invention will be described in detail with reference to FIGS. 1 through 18.

The present invention relates to an apparatus for manufacturing a megapixel multi-focus glass lens.

Figure 16:
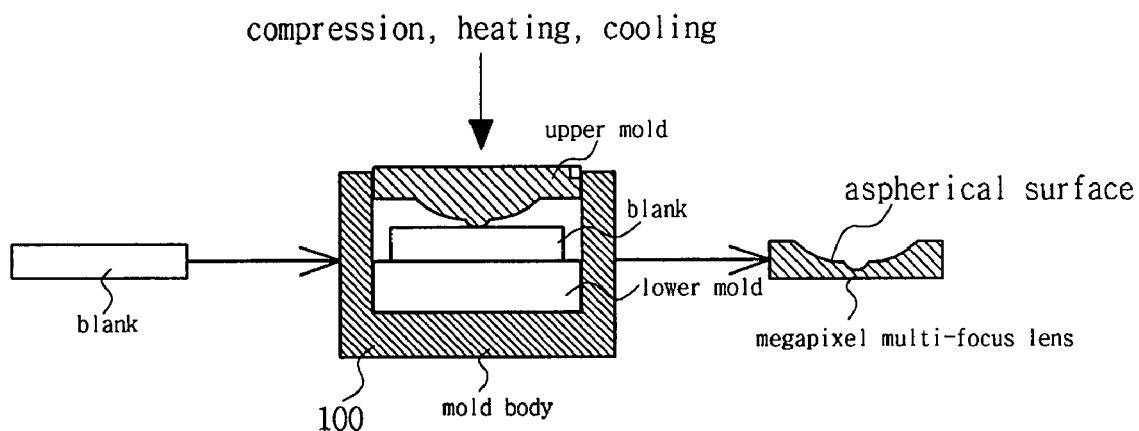
FIG. 16 is a view illustrating a process of forming a megapixel multi-focus lens according to the present invention.

As shown in FIG. 16, to manufacture the megapixel multi-focus glass lens, a blank is placed between an upper mold and a lower mold in a mold body 100 and is heated, compressed and cooled, thus forming a megapixel multi-focus glass lens having an aspherical surface.

Here, heat dissipation holes 100a are formed in the sidewall of the mold body 100 to dissipate heat generated in the mold body 100 when the lens is formed at a high temperature and high pressure.

Figure 1:
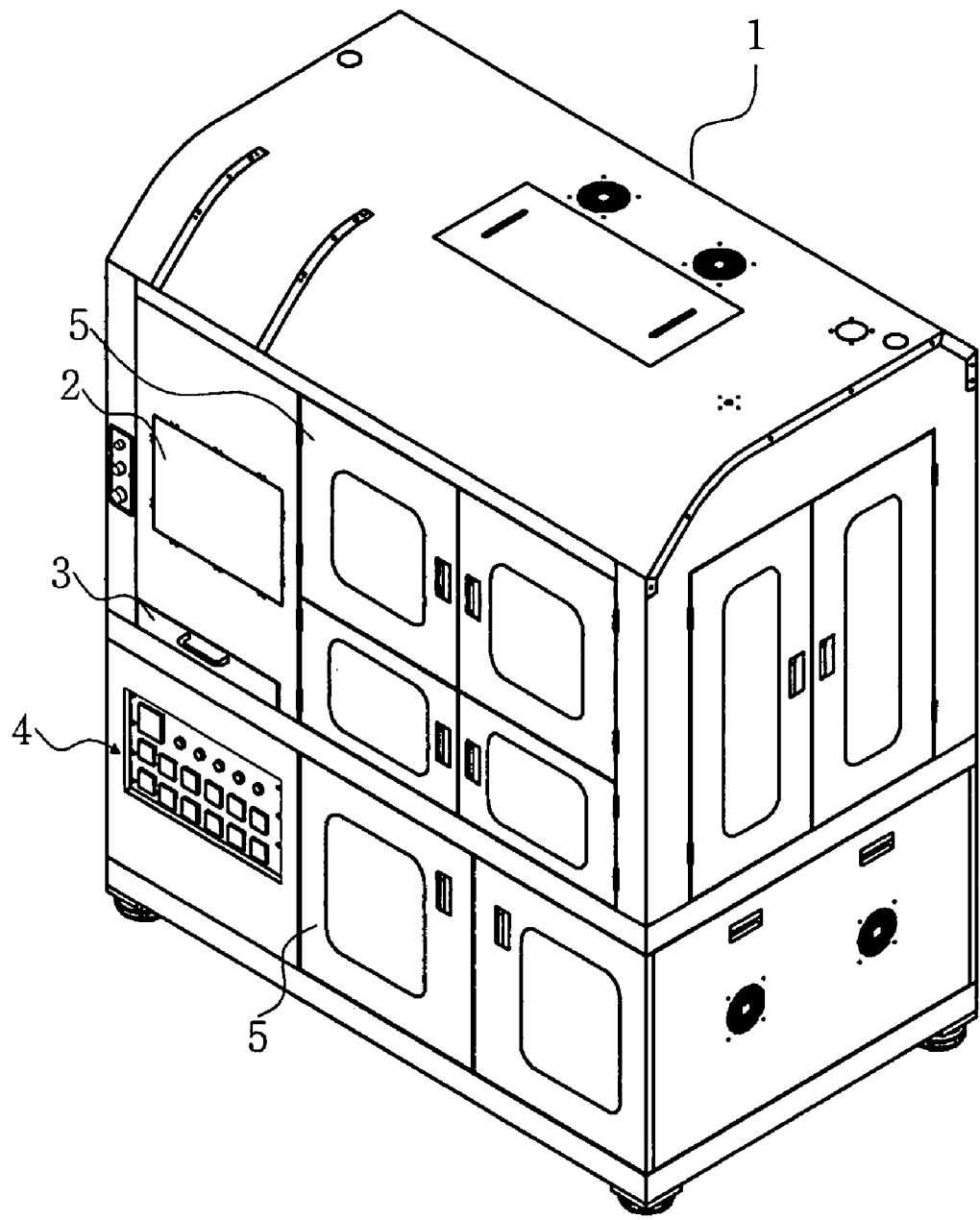
FIG. 1 is a perspective view of a cabinet defining the external appearance of the present invention.

Meanwhile, FIG. 1 is a perspective view of a cabinet 1 defining the external appearance of the present invention.

As shown in the drawing, a plurality of front doors 5 is openably provided in the front surface of the cabinet 1, and a side door 6 is also openably provided in the side surface of the cabinet 1. Furthermore, a monitor 2, which indicates the general operating state of the lens manufacturing apparatus, is provided in the top left hand corner of the front surface of the cabinet 1. A key panel 3 for inputting various commands is provided below the monitor 2 and is constructed as a drawer type structure.

In addition, a state indicator 4 is provided below the key panel 3 in order to indicate the operating conditions (setting temperature, working temperature) of a preheating device 30, a compressing device 40 and a cooling device 50 of a compression-forming means 20 of the lens manufacturing apparatus of the present invention.

Figure 2:
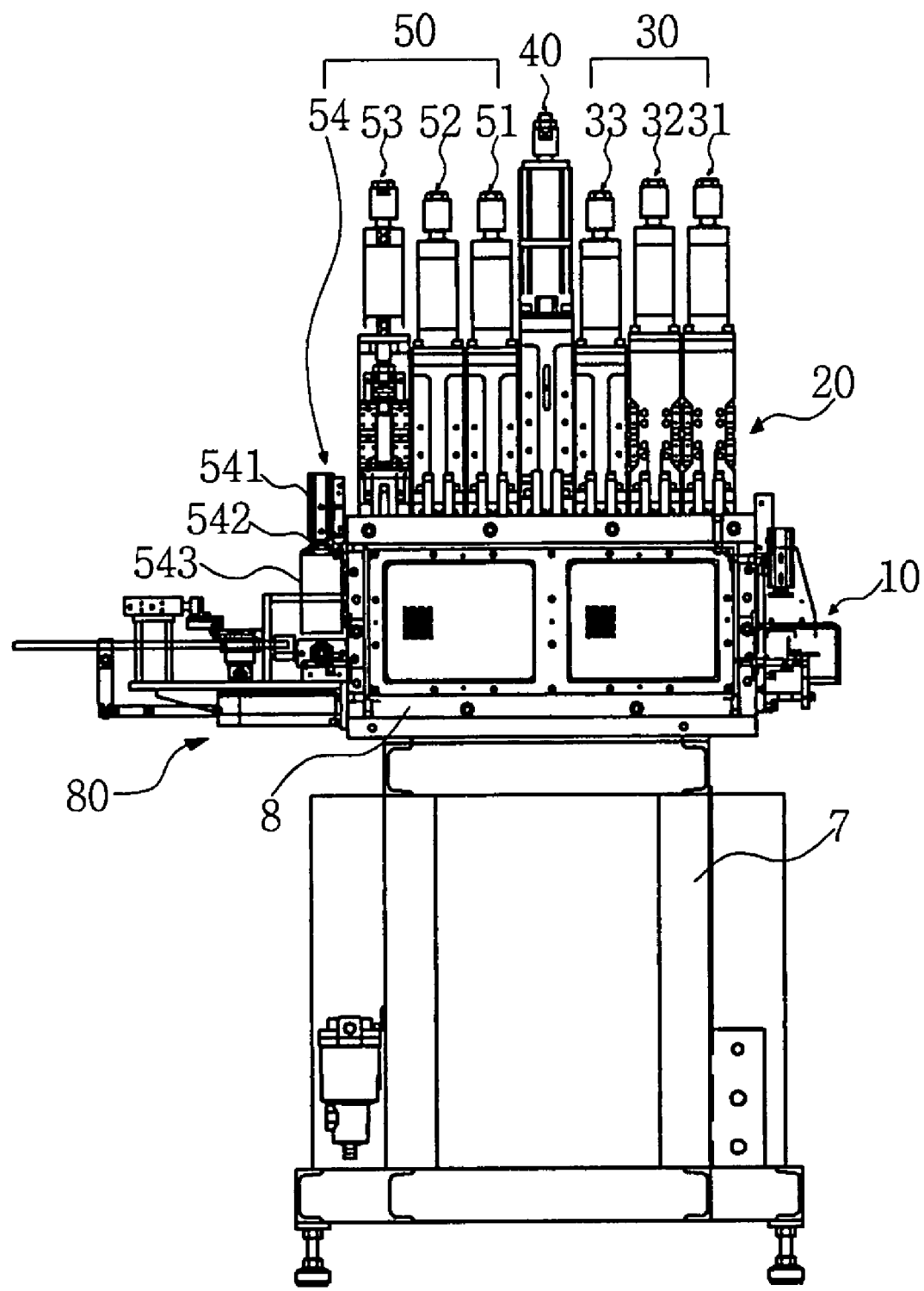
FIG. 2 is a front view of an apparatus for manufacturing a megapixel multi-focus lens, according to an embodiment of the present invention.

FIG. 2 is a front view illustrating the lens manufacturing apparatus installed in the cabinet 1.

Referring to the drawing, a forming chamber 8, which is sealed, is provided on a base 7. A loading means 10 for supplying the mold body 100, having the blank therein, to an initial position in the forming chamber 8 is provided on a first end of the forming chamber 8. A discharging means 80 is provided on a second end of the forming chamber 8, which is opposite the loading means 10, so that, after a process of forming the blank into a megapixel multi-focus lens has been completed, the mold body 100 is discharged outside through the discharging means 80.

The preheating device 30, which includes first through third preheating units 31 through 33 to preheat the blank to a desired temperature before the blank is compressed, the compressing device 40, which compresses the preheated blank at a desired pressure to form a megapixel multi-focus lens having an aspherical surface, and the cooling device 50, which includes first through fourth cooling units 51 through 54 to slowly cool the formed lens, are provided above the forming chamber 8.

The fourth cooling unit 54 is disposed around the outlet of the forming chamber 8 to secondarily cool the mold body 100 before it is discharged outside. As shown in the drawing, the fourth cooling unit 54 includes an operating bar 542, which is provided below a vertical drive member 541 so as to be movable in a vertical direction, and an upper cooler 543, which is disposed on the lower end of the operating bar 542 at a position adjacent to the upper end of the mold body 100 so as to cool the mold body 100.

Figure 3:
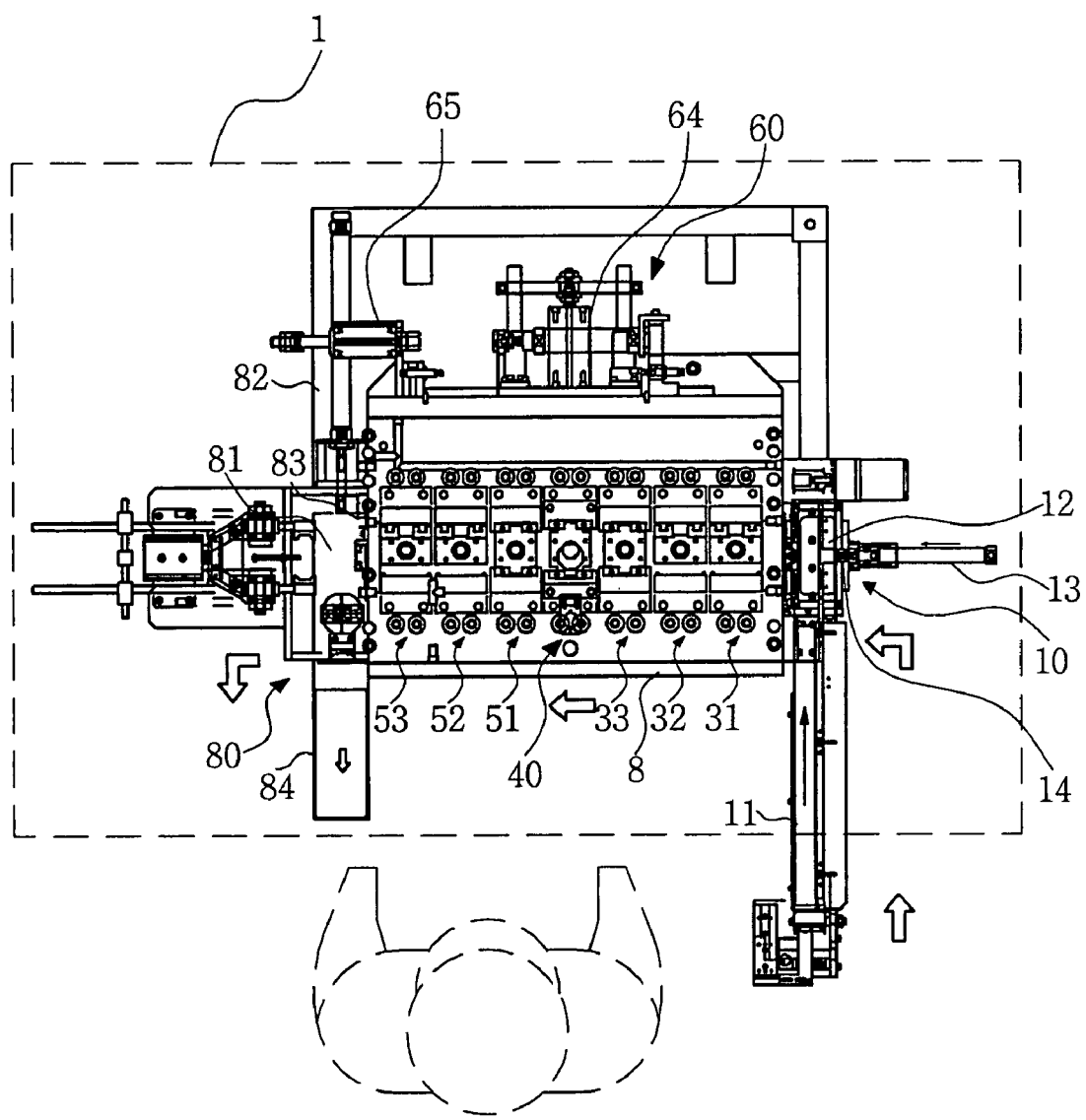
FIG. 3 is a plan view of the multi-focus lens manufacturing apparatus of FIG. 2.

FIG. 3 is a plan view of the lens manufacturing apparatus.

As shown in the drawing, a loading plate 12, onto which the mold body 100 is loaded, is provided on the right side of the forming chamber 8. A loading bar 14, which is mounted to a loading cylinder 13, is coupled at a predetermined position to the loading plate 12 and is retractably advanced to put the mold body 100, which is placed on the loading plate 12, into the forming chamber 8.

Furthermore, an input conveyor 11 is provided ahead of the front end (a lower end when seen in the drawing) of the loading plate 12 to carry the mold body 100 to the loading plate 12.

The mold body 100 is supplied onto the input conveyor 11 by a user or an automated machine such as a robot.

Meanwhile, a discharge plate 81, onto which the mold body 100, which has passed through the forming chamber 8, is provided on the left side of the forming chamber 8. A discharge bar 83, which is retractably advanced by a discharge cylinder 82, is coupled to the rear surface (the upper surface when seen in the drawing) of the discharge plate 81 in order to push the discharged mold body 100 towards the discharge conveyor 84.

That is, the mold body 100, which has been carried by the input conveyor 11, is pushed by the loading bar 14 and thus supplied into the forming chamber 8. The blank, which is placed in the mold body 100, is formed by the preheating device 30, the compression device 40 and the cooling device 50 in the forming chamber 8. Thereafter, the mold body 100, along with the formed lens, is pushed by the discharge bar 83 and thus discharged outside through the discharge conveyor 84.

Furthermore, movement of the mold body 100 in the forming chamber 8 is conducted by a position moving means 60. The position moving means 60 includes a forward-backward cylinder 64 and a leftward-rightward cylinder 65.

As shown in FIG. 3, because the loading means 10 and the discharge means 80 are installed such that they are oriented towards the front surface of the cabinet 1, the user or the automated machine can conveniently conduct the processes of inputting and outputting mold bodies 100 at the same time.

Figure 4:
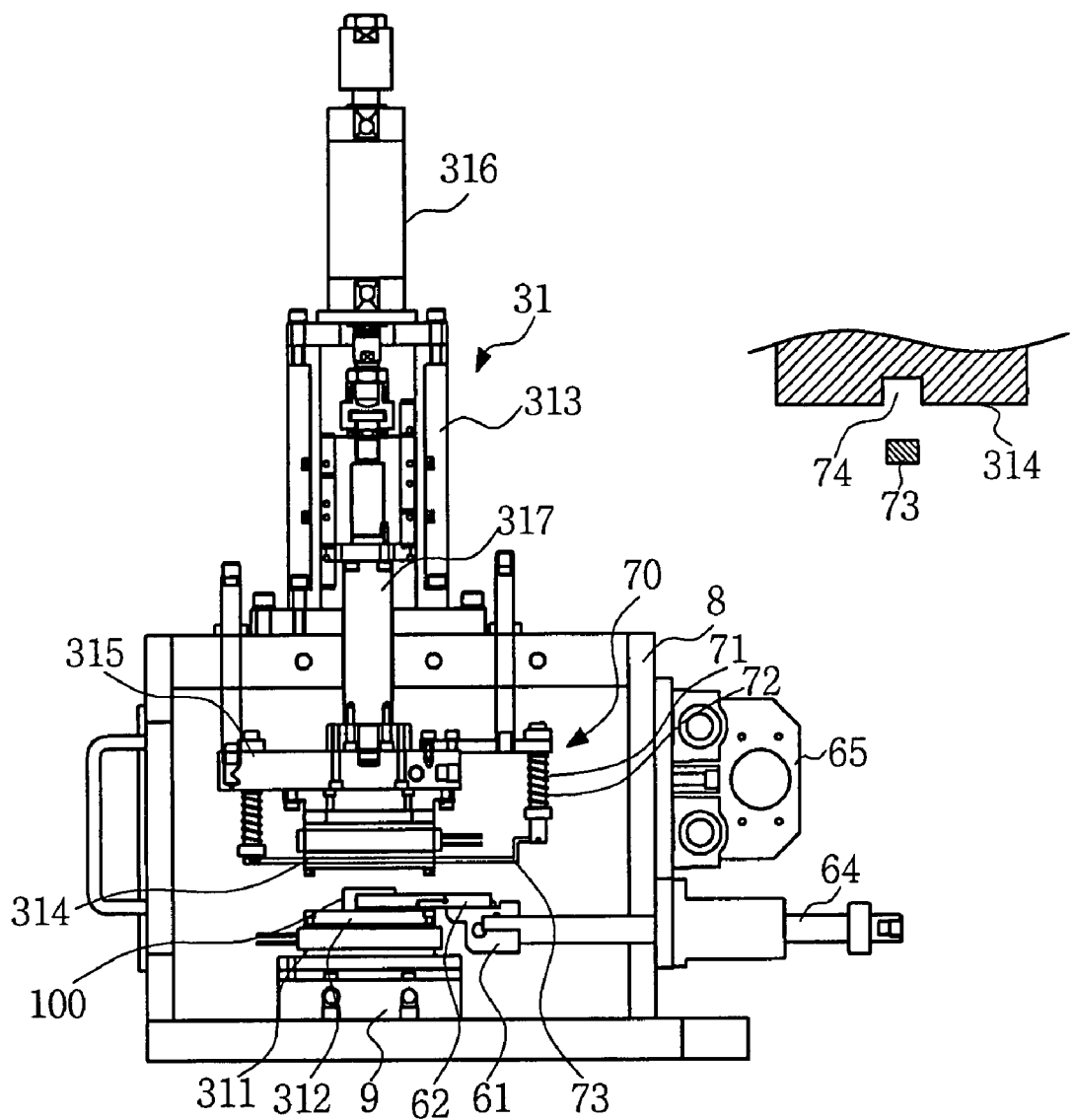
FIG. 4 is a side view showing a first preheating unit according to the present invention.

FIG. 4 illustrates the first preheating unit 31 of the preheating device 30 of the compression-forming means 20 according to the present invention.

A lower heater 311 is placed on the base plate 9, which is provided on the bottom of the forming chamber 8. A thermal conduction plate 312, which is made of cemented carbide and evenly transfers heat from the lower heater 311 to the mold body 100, is layered on the lower heater 311.

Furthermore, a guide unit 313, which comprises an LM (linear motion) guide, is vertically provided on the forming chamber 8 at a position facing the thermal conduction plate 312. A vertical drive unit 316, which comprises a hydraulic cylinder or motor and vertically moves an operating bar 317, is provided on the guide unit 313. The operating bar 317 coupled to the vertical drive unit 316 is linearly moved along the guide unit 313 in a vertical direction.

The lower end of the operating bar 317 is disposed in the forming chamber 8. As shown in the drawing, an upper heater 314 is provided under the lower end of the operating bar 317, such that the upper heater 314 moves downwards and heats the mold body 100 placed on the thermal conduction plate 312. A cooling plate 315 is provided between the upper heater 314 and the operating bar 317 to prevent heat from being transferred from the upper heater 314 to the upper portion of the first preheating unit 31 through the operating bar 317.

A plurality of heater rods, each of which has a heating coil wound around it, is installed in each of the lower heater 311 and the upper heater 314. A cooling water line, through which cooling water passes, is defined in the cooling plate 315.

Furthermore, a mold body separating unit 70 is coupled both to the cooling plate 315 and to the upper heater 314 to separate the mold body 100 from the upper heater 314 such that the mold body 100 is prevented from being moved upwards along with the upper heater 314 when the upper heater 314 is moved upwards again after having been moved downwards and having contacted the upper surface of the mold body 100.

In detail, vertical rods 71 are provided in respective opposite ends of the cooling plate 315 so as be movable in a vertical direction. A return spring 72 is fitted over each vertical rod 71, so that the vertical rod 71 is biased by the corresponding return spring 72 in the direction in which the vertical rod 71 is moved downwards. In addition, a separating bar 73, which couples the two vertical rods 71 to each other, is provided in the mold body separating unit 70. The separating bar 73 horizontally passes through the lower surface of the upper heater 314. A seating groove 74, into which the separating bar 73 is seated, is formed in the lower surface of the upper heater 314.

Therefore, when the upper heater 314 is moved downwards and is brought into contact with the upper surface of the mold body 100, the separating bar 73 maintains the state of being inserted into the seating groove 74 of the upper heater 314. Thereafter, when the upper heater 314 is moved upwards, the separating bar 73 is moved downwards by the elastic force of the return spring 72, thus separating the mold body 100 from the upper heater 314.

The mold body 100, which has been primarily preheated by the first preheating unit 31, is moved by a corresponding carrying arm 62 of a horizontal arm 61 to a second preheating position, at which the mold body 100 is secondarily preheated. The first preheating unit 31 preheats the mold body 100 to a temperature ranging from 300° C. to 400° C.

Figure 5:
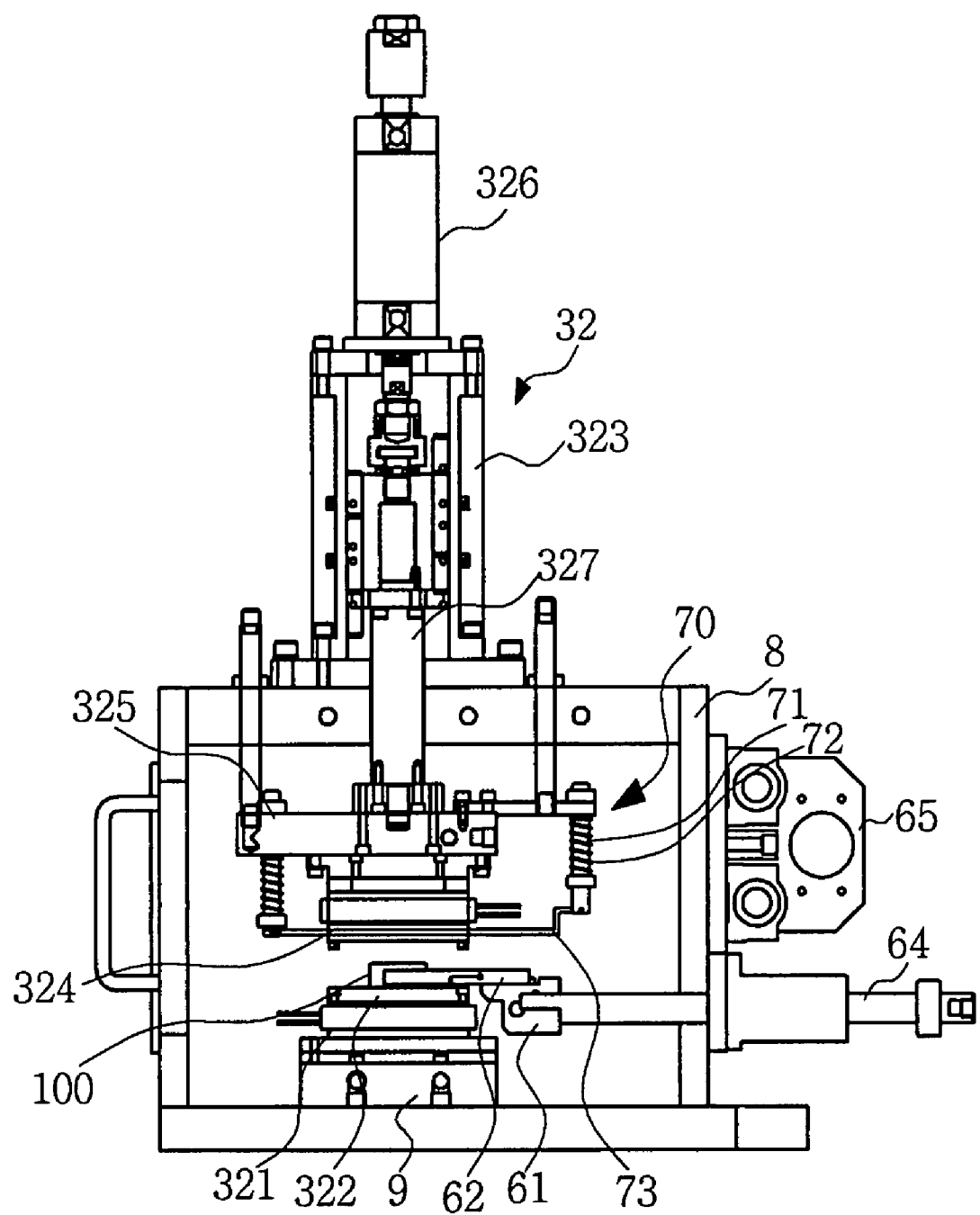
FIG. 5 is a side view showing a second preheating unit according to the present invention.

FIG. 5 illustrates the second preheating unit 32 of the preheating device 30 of the compression-forming means 20 according to the present invention.

The second preheating unit 32 has almost the same construction as that of the first preheating unit 31.

In detail, a lower heater 321 is placed on the base plate 9, which is provided on the bottom of the forming chamber 8. A thermal conduction plate 322 is layered on the lower heater 321. Furthermore, a guide unit 323 is provided on the forming chamber 8. A vertical drive unit 326, which comprises a hydraulic cylinder or motor and vertically moves an operating bar 327, is provided on the guide unit 323. The operating bar 327 coupled to the vertical drive unit 326 is linearly moved along the guide unit 323 in a vertical direction.

In addition, an upper heater 324, which is moved downwards by the operating bar 327 and heats the mold body 100 placed on the thermal conduction plate 322, is provided under the lower end of the operating bar 327. A cooling plate 325 is provided between the upper heater 324 and the operating bar 327 to prevent heat from being transferred from the upper heater 324 to the upper portion of the second preheating unit 32 through the operating bar 327.

A plurality of heater rods, each of which has a heating coil wound around it, is installed in each of the lower heater 321 and the upper heater 324. A cooling water line, through which cooling water passes, is defined in the cooling plate 325.

Furthermore, a mold body separating unit 70 is coupled both to the cooling plate 325 and to the upper heater 324 to separate the mold body 100 from the upper heater 324 such that the mold body 100 is prevented from being moved upwards along with the upper heater 324 when the upper heater 324 is moved upwards again after having been moved downwards and having contacted the upper surface of the mold body 100. The mold body 100, which has been secondarily preheated by the second preheating unit 32, is moved by a corresponding carrying arm 62 of the horizontal arm 61 to a third preheating position.

The second preheating unit 32 preheats the mold body 100 to a temperature ranging from 500° C. to 600° C.

Figure 6:
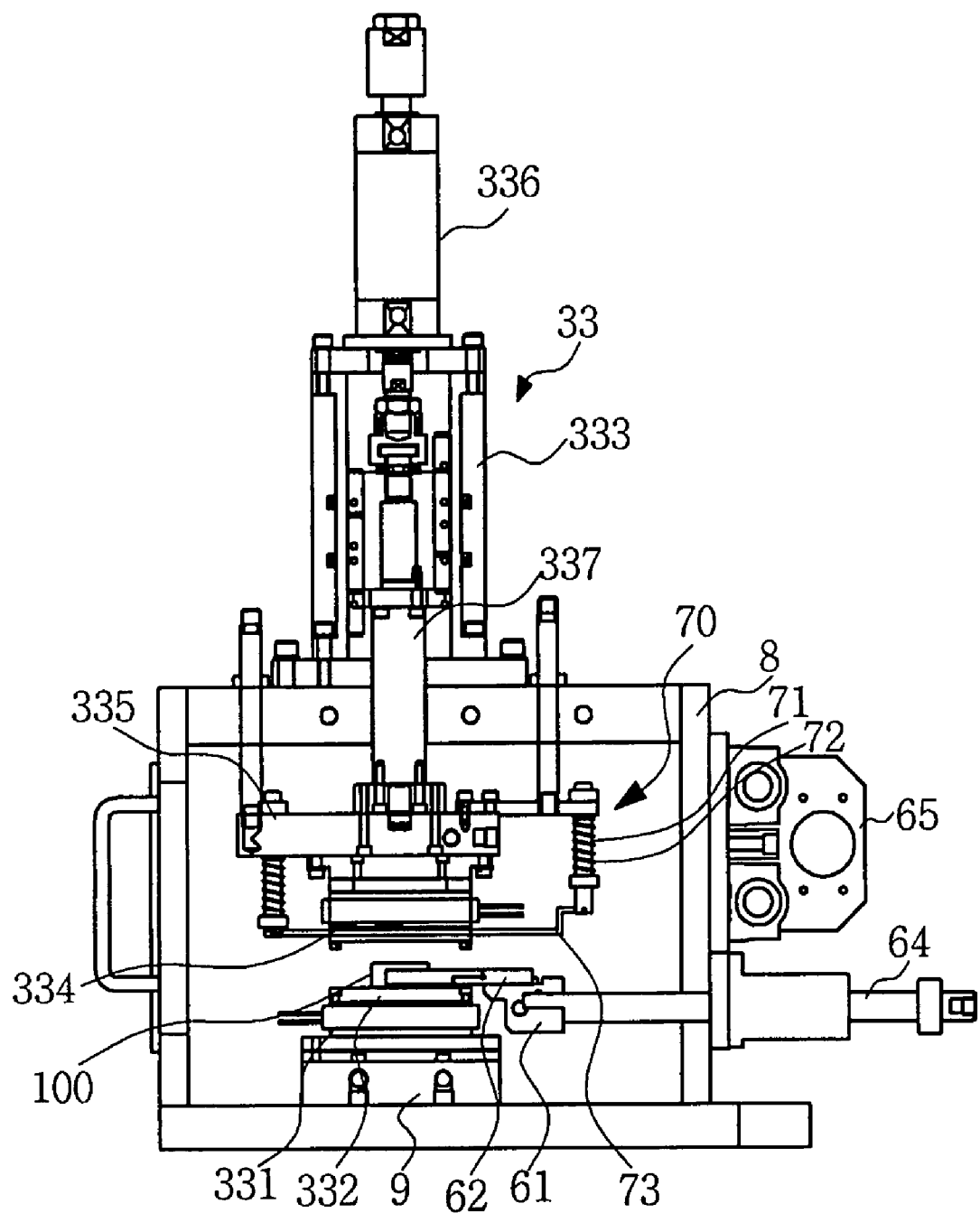
FIG. 6 is a side view showing a third preheating unit according to the present invention.

FIG. 6 illustrates the third preheating unit 33 of the preheating device 30 of the compression-forming means 20 according to the present invention. The third preheating unit 33 also has the construction similar to that of the first preheating unit 31.

In detail, a lower heater 331 is placed on the base plate 9, which is provided on the bottom of the forming chamber 8. A thermal conduction plate 332 is layered on the lower heater 331. Furthermore, a guide unit 333, which comprises a cross roller guide, is provided on the forming chamber 8. A vertical drive unit 336, which comprises a hydraulic cylinder or motor and vertically moves an operating bar 337, is provided on the guide unit 333. The operating bar 337, coupled to the vertical drive unit 336, is linearly moved along the guide unit 333 in a vertical direction.

Because the guide unit 333 comprises the cross roller guide, vertical linear motion of the operating bar 337 can be conducted more precisely.

In addition, an upper heater 334, which is moved downwards by the operating bar 337 and heats the mold body 100 placed on the thermal conduction plate 332, is provided under the lower end of the operating bar 337. A cooling plate 335 is provided between the upper heater 334 and the operating bar 337 to prevent heat from being transferred from the upper heater 334 to the upper portion of the third preheating unit 33 through the operating bar 337.

A plurality of heater rods, each of which has a heating coil wound around it, is installed in each of the lower heater 331 and the upper heater 334. A cooling water line, through which cooling water passes, is defined in the cooling plate 335.

Furthermore, a mold body separating unit 70 is coupled both to the cooling plate 335 and to the upper heater 334 to separate the mold body 100 from the upper heater 334 such that the mold body 100 is prevented from being moved upwards along with the upper heater 334 when the upper heater 334 is moved upwards again after having been moved downwards and having contacted the upper surface of the mold body 100. The mold body 100, which has been tertiarily preheated by the second preheating unit 32, is moved by a corresponding carrying arm 62 of the horizontal arm 61 to the position at which the blank is compressed.

The third preheating unit 33 preheats the mold body 100 to a temperature ranging from 550° C. to 600° C.

Figure 7:
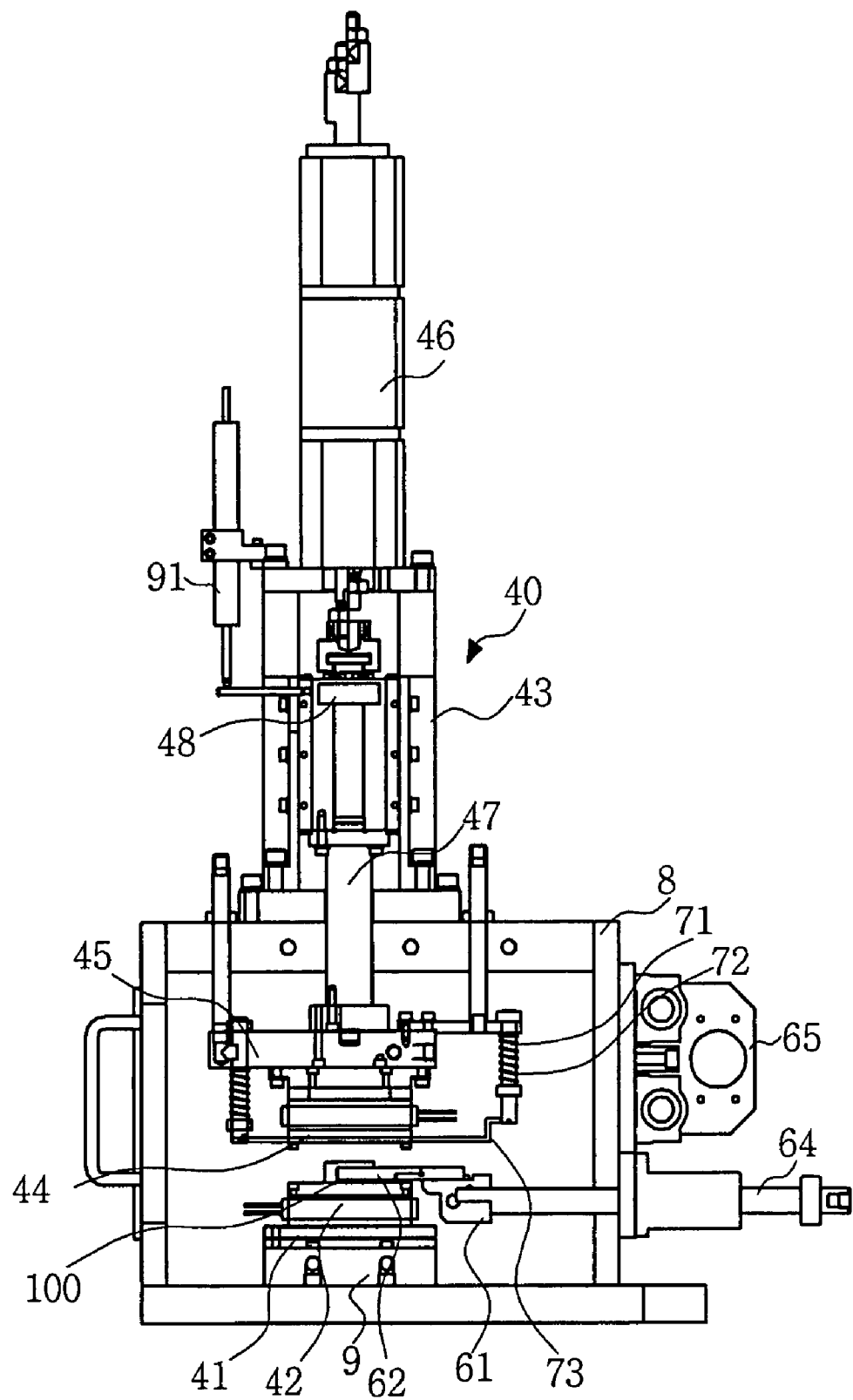
FIG. 7 is a side view showing a compressing device according to the present invention.

FIG. 7 is a side view showing the compressing device 40 of the compression-forming means 20 according to the present invention.

The compressing device 40 compresses the mold body 100, which has been preheated to a desired temperature by the first through third preheating units 31 through 33, at a preset pressure, such that the blank is formed into a megapixel multi-focus lens having an aspherical surface.

For this, a lower heater 41 is placed on the base plate 9, which is provided on the bottom of the forming chamber 8. A thermal conduction plate 42 is layered on the lower heater 41. Furthermore, a guide unit 43, which comprises a cross roller guide, is provided on the forming chamber 8. A vertical drive unit 46, which comprises a hydraulic cylinder or motor and vertically moves an operating bar 47, is provided on the guide unit 43. The operating bar 47, coupled to the vertical drive unit 46 is linearly moved along the guide unit 43 in a vertical direction.

In addition, an upper heater 44, which is moved downwards by the operating bar 47 and heats and compresses the mold body 100, placed on the thermal conduction plate 42, is provided under the lower end of the operating bar 47. A cooling plate 45 is provided between the upper heater 44 and the operating bar 47 to prevent heat from being transferred from the upper heater 44 to the upper portion of the compressing device 40 through the operating bar 47.

A plurality of heater rods, each of which has a heating coil wound around it, is installed in each of the lower heater 41 and the upper heater 444. A cooling water line, through which cooling water passes, is defined in the cooling plate 45.

Furthermore, a mold body separating unit 70 is coupled both to the cooling plate 45 and to the upper heater 44 to separate the mold body 100 from the upper heater 44 such that the mold body 100 is prevented from being moved upwards along with the upper heater 44 when the upper heater 44 is moved upwards again after having been moved downwards and having contacted and compressed the upper surface of the mold body 100. The mold body 100, which has been compressed by the compressing device 40, is moved by a corresponding carrying arm 62 of the horizontal arm 61 to a first cooling position, at which the mold body 100 is primarily cooled.

As well, a measuring scale 91, which measures the distance that the upper heater 44 is vertically moved and transmits the measured data to a controller 96 of a control means 90, is provided in the compressing device 40. A load cell 48 is provided on the upper end of the operating bar 47 to detect the compression pressure of the vertical drive unit 46.

Thus, the compressing device 40 is controlled such that the mold body 100 is compressed at a pressure at which the lens is optimally formed both using distance information measured by the measuring scale 91 and pressure information detected by the load cell 48.

In other words, the pressure value at which the lens is formed into the optimum state is preset in the controller 96 of the control means 90. When the compression-forming process is conducted, the mold body 100 is compressed to form the lens until the pressure detected by the load cell 48 is equal to the reference pressure preset in the controller 96.

The compressing device 40 heats and compresses the mold body 100 at a temperature ranging from 550° C. to 600° C.

Figure 8:
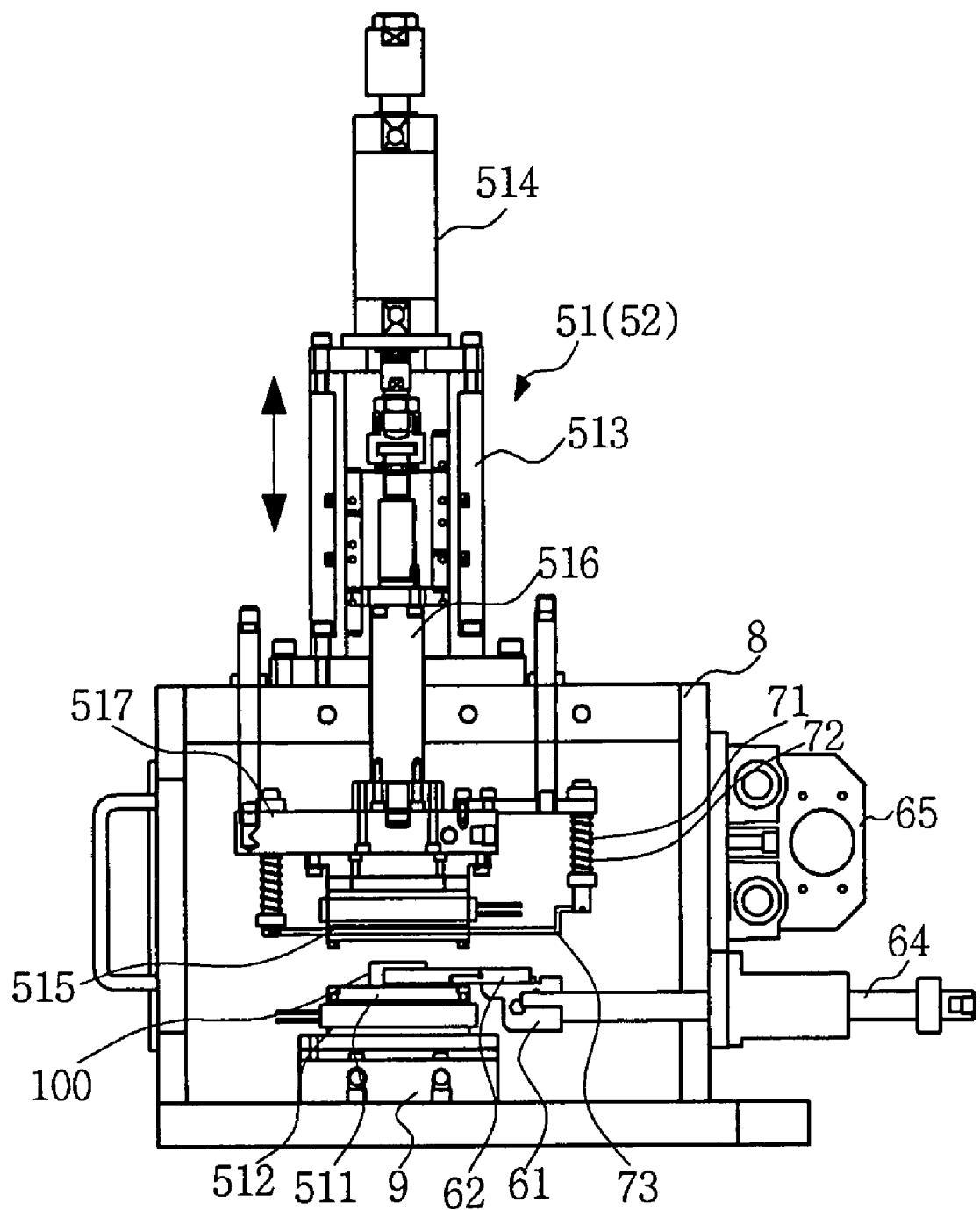
FIG. 8 is a side view showing each of first and second cooling units according to the present invention.

FIG. 8 illustrates each of first and second cooling units 51 and 52 of the cooling device 50 of the compression-forming means 20 according to the present invention.

In each of the first and second cooling units 51 and 52, a lower cooler 511 is placed on the base plate 9, which is provided on the bottom of the forming chamber 8. A thermal conduction plate 512, which is made of cemented carbide and evenly supplies cool air from the lower cooler 511 to the mold body 100, is layered on the lower heater 511.

Furthermore, a guide unit 513, which comprises a cross roller guide, is vertically provided on the forming chamber 8 at a position facing the thermal conduction plate 512. A vertical drive unit 514, which comprises a hydraulic cylinder or motor and vertically moves an operating bar 516, is provided on the guide unit 513. The operating bar 516 coupled to the vertical drive unit 514 is linearly moved along the guide unit 513 in a vertical direction.

The lower end of the operating bar 516 is disposed in the forming chamber 8. As shown in the drawing, an upper cooler 515 is provided under the lower end of the operating bar 516, such that the upper cooler 515 moves downwards and cools the mold body 100 placed on the thermal conduction plate 512. A separate horizontal plate 517 is provided between the upper cooler 515 and the operating bar 516.

In addition, a cooling water line, through which cooling water passes, is defined between the upper cooler 515 and the lower cooler 511. A mold body separating unit 70 is coupled both to the horizontal plate 517 and to the upper cooler 515 to separate the mold body 100 from the upper cooler 515 such that the mold body 100 is prevented from being moved upwards along with the upper cooler 515 when the upper cooler 515 is moved upwards again after having been moved downwards and having contacted the upper surface of the mold body 100.

The mold body 100, which has been primarily and secondarily cooled by the first and second cooling units 51 and 52, is moved by a corresponding carrying arm 62 of the horizontal arm 61 to a third cooling position, at which the mold body 100 is tertiarily cooled.

The first cooling unit 51 cools the mold body 100 at a temperature ranging from 500° C. to 540° C. The second cooling unit 52 cools the mold body 100 at a temperature ranging from 450° C. to 470° C.

Figure 9:
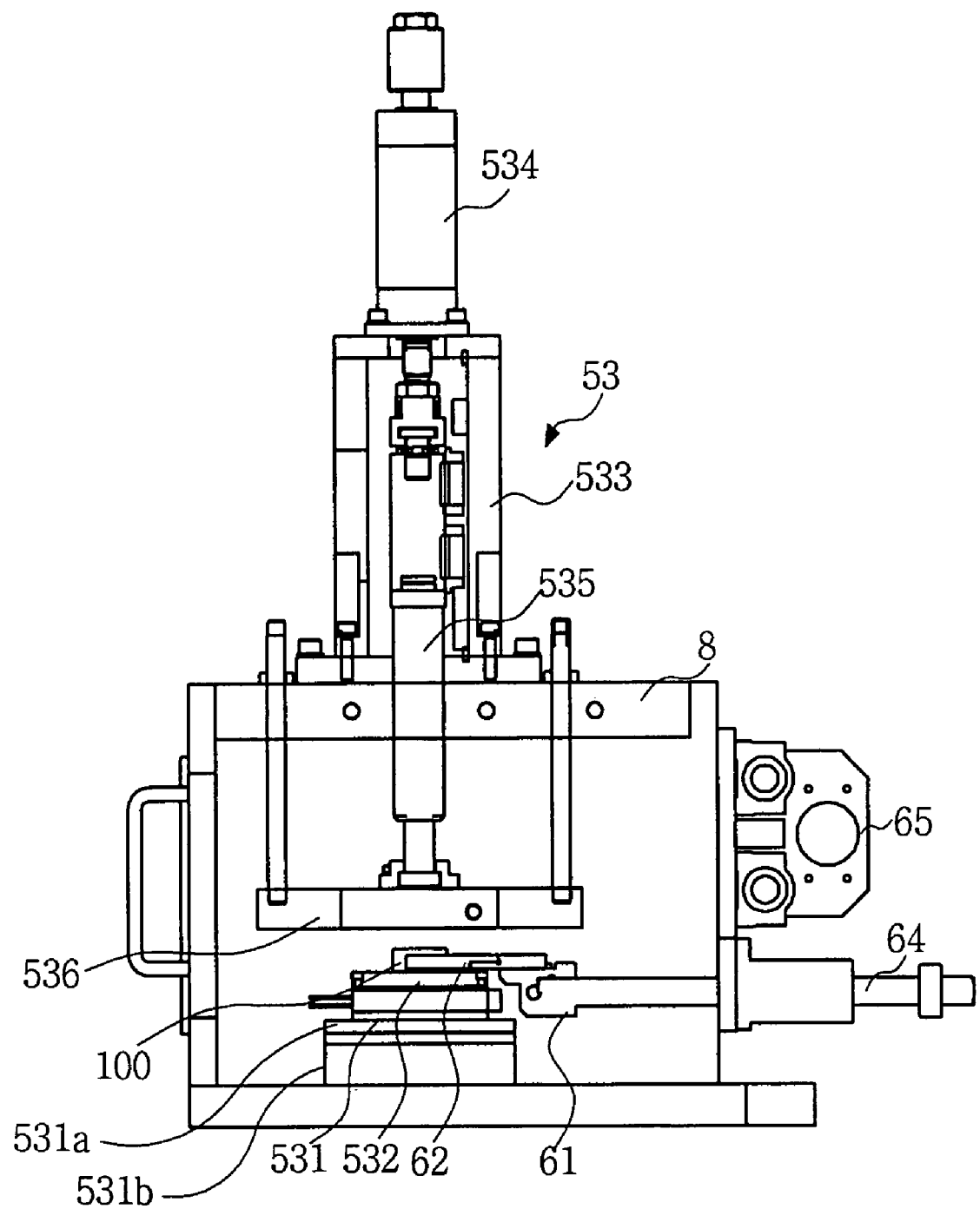
FIG. 9 is a side view showing a third cooling unit according to the present invention.

FIG. 9 illustrates a third cooling unit 53 of the cooling device 50.

In the third cooling unit 53, a lower cooler 531 is placed on the base plate 9 provided on the bottom of the forming chamber 8, so that the mold body 100 is seated onto the lower cooler 531.

Here, the lower cooler 531 is placed on a separate support 531a such that the mold body 100 is directly seated on the upper surface of the lower cooler 531. A height adjustment plate 531b for adjusting the height of the lower cooler 531 is removably provided under the lower surface of the support 531a.

In detail, after use for a long period, the thermal conduction plates 42, 312, 322, 332 and 512 are worn by a thickness of 0.3 mm to 0.5 mm. As such, in the case where the thermal conduction plates 42, 312, 322, 332 and 512 are worn, a difference in height between them and the lower cooler 531 of the third cooling unit 53 occurs. To solve this problem, the height adjustment plate 531b is removed from the support 531a and is ground by the height difference. Thereafter, the ground height adjustment plate 531b is again placed under the support 531a. Then, the heights of the lower cooler 531 and the thermal conduction plates 42, 312, 322, 332 and 512 becomes even, so that the sliding movement of the mold body 100 can be smoothly conducted.

As described above, because the height adjustment plate 531b is removably provided under the support 531a, although there is a difference in height between the third cooling unit 53 and the other cooling units, the third cooling unit 53 can be continuously used merely by grinding the height adjustment plate 531b without replacing the entire lower cooler module of the third cooling unit 53 with a new one.

Meanwhile, a guide unit 533, which comprises an LM guide, is vertically provided on the forming chamber 8. A vertical drive unit 534, which comprises a hydraulic cylinder or motor and vertically moves an operating bar 535, is provided on the guide unit 533. The operating bar 535 coupled to the vertical drive unit 534 is linearly moved along the guide unit 533 in a vertical direction.

The lower end of the operating bar 535 is disposed in the forming chamber 8. As shown in the drawing, an upper cooler 536 is provided under the lower end of the operating bar 535, such that the upper cooler 536 moves downwards and cools the mold body 100 placed on the lower cooler 531.

In addition, a cooling water line, through which cooling water passes, is defined between the upper cooler 536 and the lower cooler 531.

The mold body 100, which has been tertiarily cooled by the third cooling units 53, is moved by a corresponding carrying arm 62 of the horizontal arm 61 to the discharge plate 81 and is quaternarily cooled by a fourth cooling unit 54 before being discharged outside.

The third cooling unit 53 cools the mold body 100 at a temperature of 100° C. or less.

FIGS. 10a through 10d illustrate the position moving means 60.

The position moving means 60 serves to move the mold bodies 100, which have been input into the forming chamber 8, to the subsequent processing positions.

In detail, the mold bodies 100 are consecutively supplied to the respective corresponding processes. To move the several mold bodies 100, which exist in the respective processing positions, to the subsequent processing positions, the number of carrying arms 62 corresponding to the number of processes are mounted to the horizontal arm 61 such that they are oriented towards the front surface of the cabinet 1. A notch 66 is formed in one edge of each carrying arm 62 to form a contact edge that is in line contact with each mold body 100.

Figure 10A:
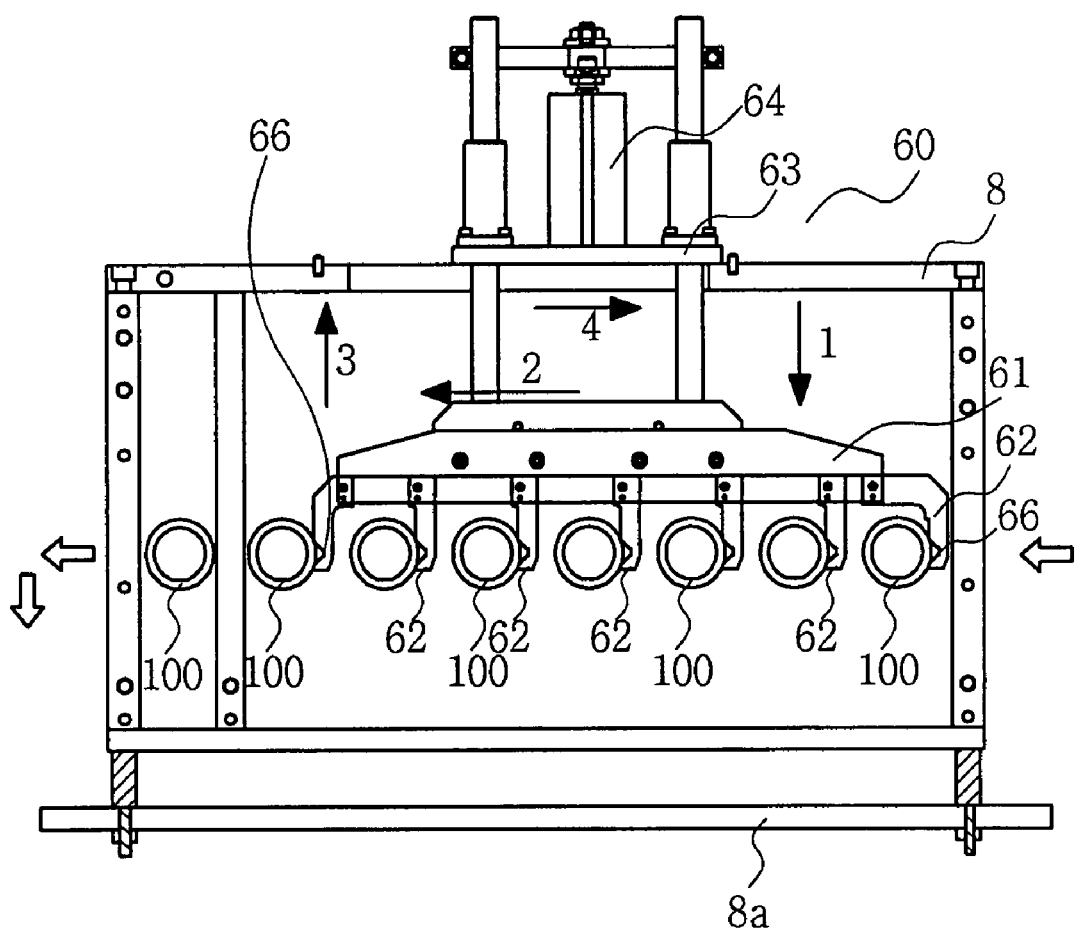
FIG. 10a is a plan view showing a position moving means according to the present invention.

Here, to form the notch 66, contact parts 622 are formed on an end of the one edge of the carrying arm 62. As shown in FIG. 10c, each contact part 622 has a cross-section which is reduced in width from the proximal end thereof to the distal end in the same shape as an isosceles triangle. Thus, as shown in FIG. 10d, when the carrying arm 62 is brought into contact with the sidewall of the mold body 100 to move it to the subsequent process, because the contact parts 622 are in line contact with the mold body 100, the carrying arm 62 is prevented from closing the heat dissipation holes 100a, which are formed in the sidewall of the mold body 100.

In other words, when the carrying arm 62 is brought into contact with the mold body 100, if the carrying arm 62 is in surface contact with the mold body 100, the heat dissipation holes 100a of the mold body 100 may be closed by the carrying arm 62. In this case, because heat in the mold body 100 cannot be discharged outside, the lens formation ability of the lens manufacturing apparatus is deteriorated and, thus the quality of the lens decreases. However, in the present invention, because the carrying arm 62 is in line contact with the mold body 100, the heat dissipation holes 100a are prevented from being closed. Therefore, superior lens formation ability of the lens manufacturing apparatus is ensured, so that a high quality of lens can be produced.

Meanwhile, a movable member 63, which is coupled to the horizontal arm 61, is provided on the rear surface of the forming chamber 8. The movable member 63 is coupled to the forward-backward cylinder 64, which moves the horizontal arm 61 forwards and backwards. Furthermore, as shown in FIG. 3, the leftward-rightward cylinder 65, which moves the movable member 63 leftwards and rightwards but is not shown in FIG. 10a, is provided on an end of the rear surface of the forming chamber 8.

Figure 10B:
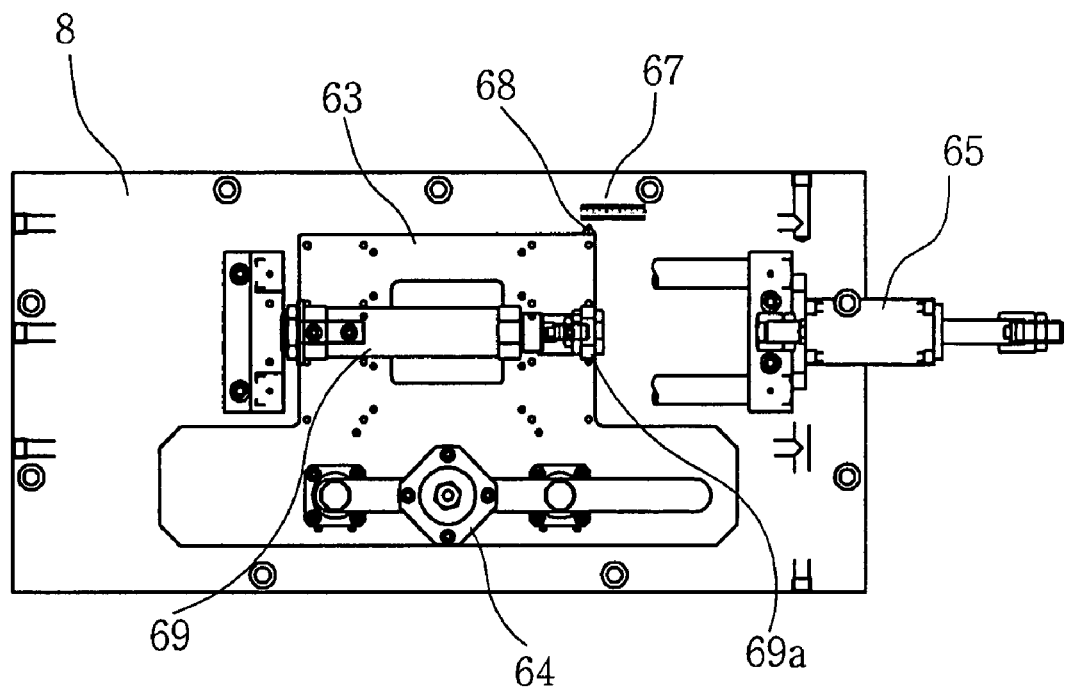
Figure 10C:
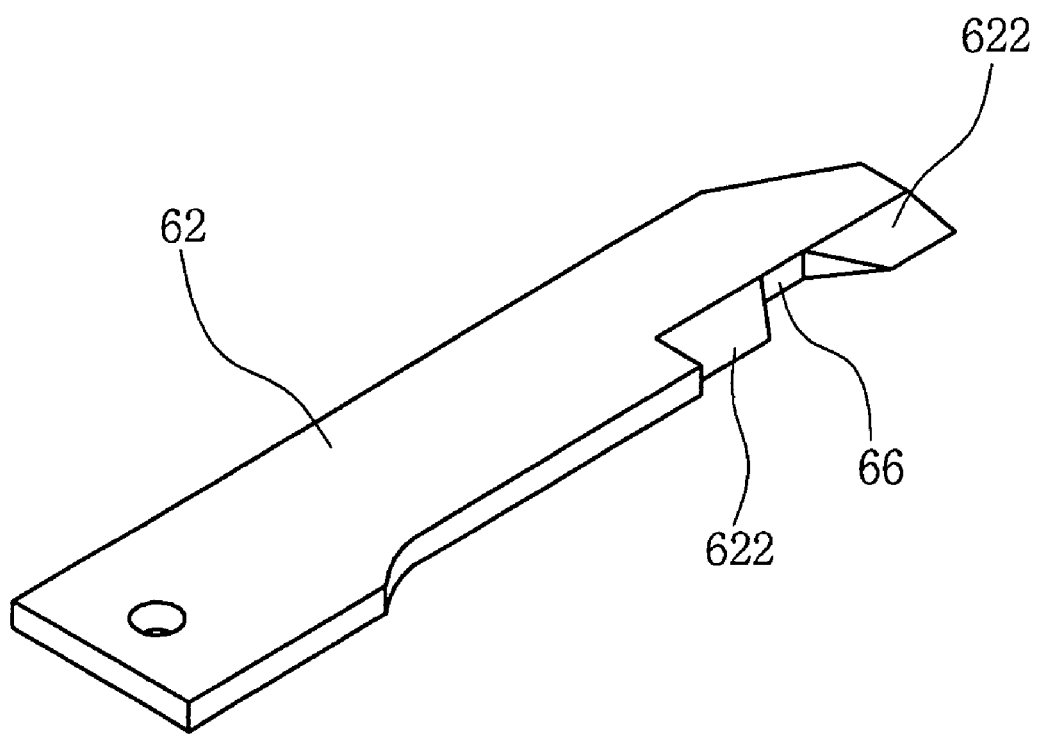
FIG. 10c is a perspective view of a carrying arm used in the position moving means according to the present invention.
Figure 10D:
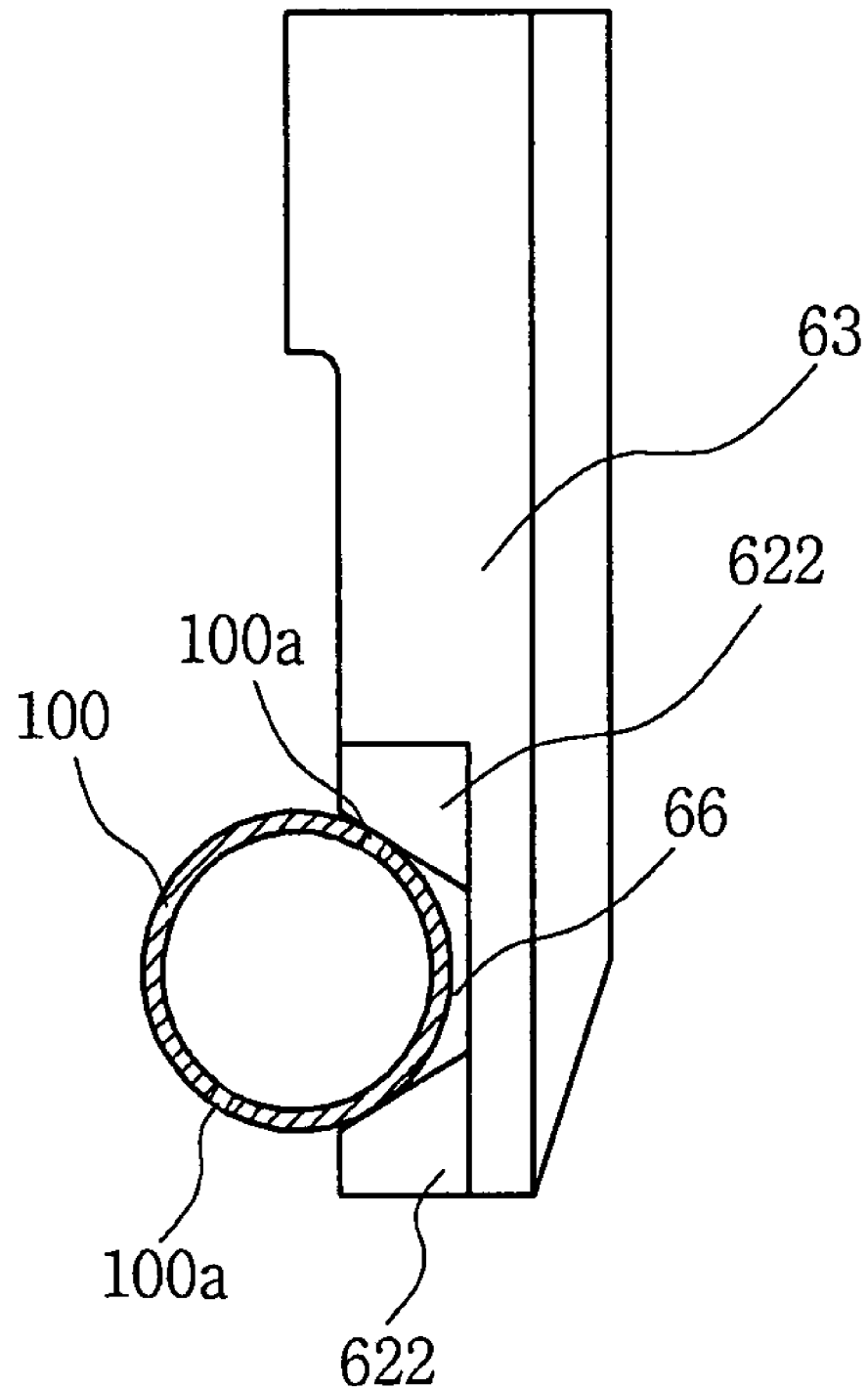
FIG. 10d is a view showing the operation of the carrying arm of FIG. 10c.

In addition, as shown in FIG. 10b, a null point setting unit 69, which precisely sets the carrying arms 62 at initial positions thereof, is provided on the movable member 63. The null point setting unit 69 is coupled at a first position thereof to the rear surface of the forming chamber 8 and is coupled at a second position thereof to the movable member 63. An adjustment nut 69a to be manipulated by the user is provided on one end of the null point setting unit 69.

In detail, when the user rotates the adjustment nut 69a, the null point setting unit 69 is moved to the left or the right, thus minutely moving the movable member 63 to the left or the right. Thereby, the initial positions of the carrying arms 62 can be precisely adjusted.

Preferably, the initial positions of the carrying arms 62 are precisely adjusted depending on the size of the mold bodies 100.

A reference ruler 67 is provided at an upper position on the rear surface of the forming chamber 8. A graduated indicator 68, which indicates the scale of the reference ruler 67, protrudes upwards from the upper end of the movable member 63.

Therefore, the user observes the position of the reference ruler 67 which is indicated by the graduated indicator 68, and rotates the adjustment nut 69a. In that manner, the initial positions of the carrying arms 62 can be precisely adjusted.

In the position moving means 60 having the above-mentioned construction, when a control signal is transmitted from the controller 96 of the control means 90 to the position moving means 60, that is, after the preheating, compressing and cooling processes of the compression-forming means 20 in the forming chamber 8 are conducted, the carrying arms 62 are moved by the forward-backward cylinder 64 forwards (in the direction designated by the reference numeral 1) and are thus disposed adjacent to the corresponding mold bodies 100, which exist at the respective processing positions. Subsequently, the carrying arms 62 are moved by the leftward-rightward cylinder 65 to the left (in a direction 2) when seen in the drawing to move the mold bodies 100 to the subsequent processing positions. In this state, the carrying arms 62 are moved slightly away from the respective mold bodies 100 and retracted in the direction 3. Thereafter, the carrying arms 62 are moved in the direction 4 to return to the original positions.

As such, the preheating, compressing and cooling processes are consecutively conducted in the forming chamber 8 by the operation of the position moving means 60.

Meanwhile, as shown in FIG. 10a, a radiant heat blocking plate 8a is mounted to the front surface of the forming chamber 8 to prevent heat, generated in the forming chamber 8, from being radiated to the front surface of the cabinet 1.

Because heat generated in the forming chamber 8 is prevented from being radiated to the front surface of the cabinet 1 by the radiant heat blocking plate 8a, the user can conduct work more comfortably.

Figure 11:
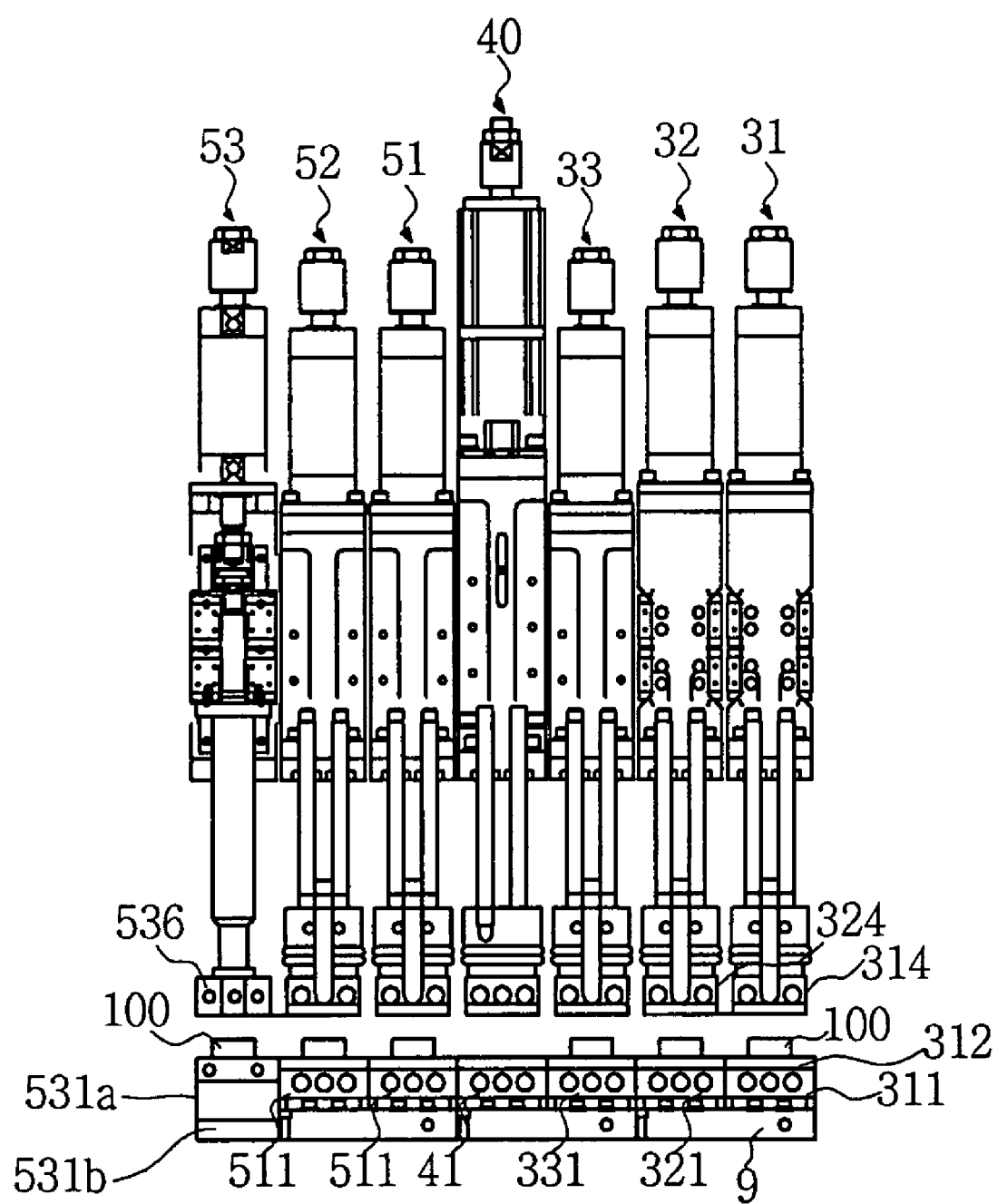
FIG. 11 is a front view showing a compression-forming means according to the present invention.

FIG. 11 illustrates the preheating device 30, the compressing device 40 and the cooling device 50 of the compression-forming means 20.

The first through third preheating units 31 through 33, the compressing device 40 and the first through third cooling units 51 through 53 are arranged in a line in the forming chamber 8. The mold body 100 is placed at every preheating, compressing and cooling position.

That is, in the present invention, the mold bodies 100, each of which has the blank, are consecutively supplied into the forming chamber 8. In this state, the first through third preheating units 31 through 33, the compressing device 40, and the first through third cooling units 51 through 53 are operated at the same time to preheat, compress and cool the mold bodies 100. When one operation is completed, the position moving means 60 described above moves the mold bodies 100 to the subsequent processing positions. Therefore, multi-focus lenses are consecutively manufactured.

Figure 12:
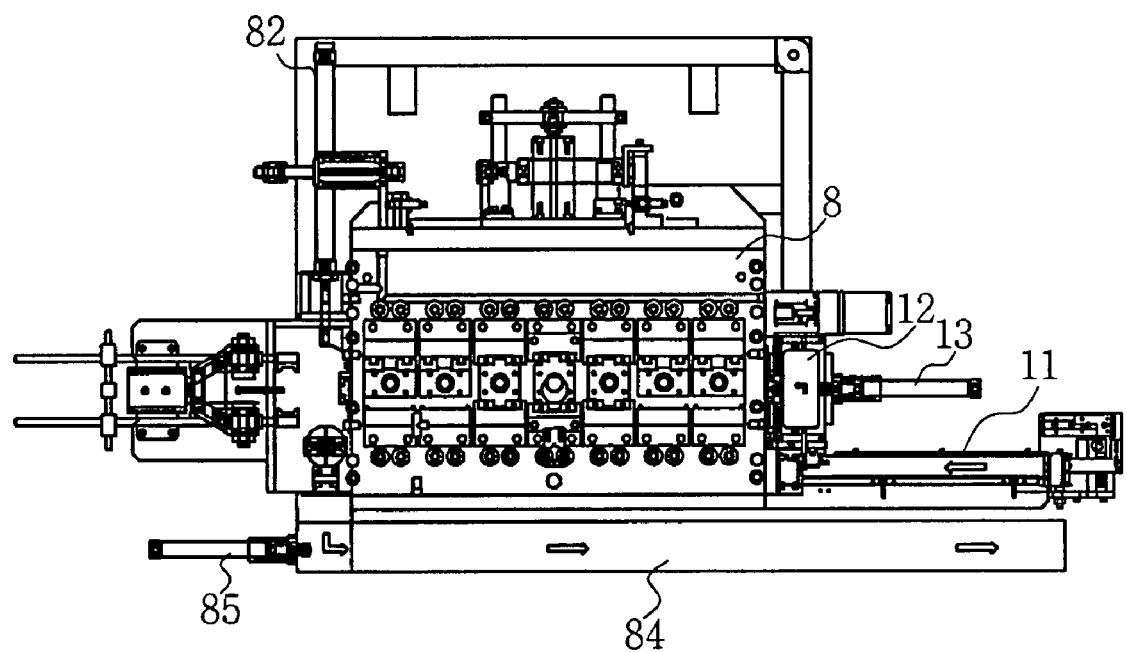
FIG. 12 is a plan view showing another embodiment of a discharging means according to the present invention.

FIG. 12 illustrates another embodiment of the loading means 10 and the discharge means 80 according to the present invention.

In this embodiment, an input conveyor 11 of the loading means 10 is oriented in a lateral direction of the forming chamber 8. A discharge conveyor 84 of the discharge means 80 is provided parallel with the input conveyor 11 on the front surface of the forming chamber 8.

Furthermore, a second discharge cylinder 85 for pushing a mold body 100 from the discharge plate 81 to the discharge conveyor 84 is provided around an entry of the discharge conveyor 84.

As such, in the case where the input conveyor 11 and the discharge conveyor 81 are installed parallel with each other in the lateral direction of the forming chamber 8, because the input and output of mold bodies 100 can be conducted from the same side, productivity is enhanced. Furthermore, because this embodiment makes it possible for the user to easily observe the interior of the lens manufacturing apparatus after opening the front doors 5 of the cabinet 1, when a malfunction occurs, maintenance and repair are convenient.

Figure 13:
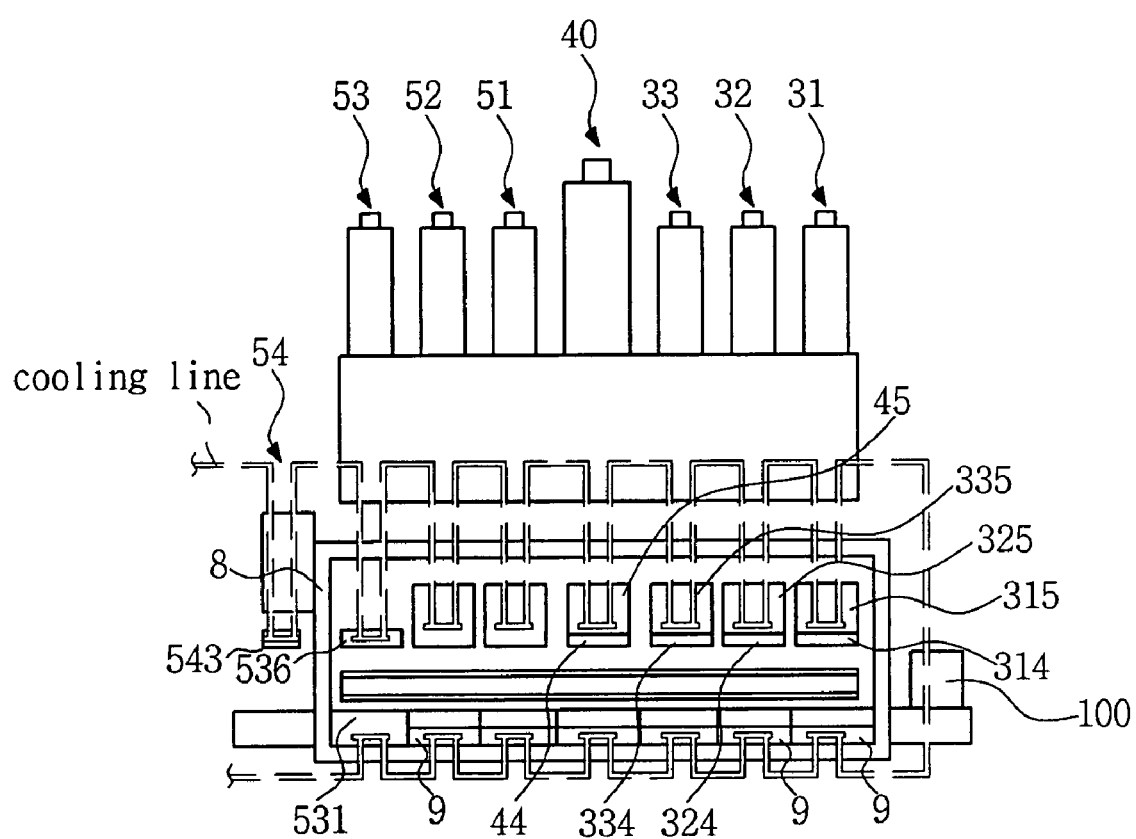
FIG. 13 is a view showing a cooling water line defined in the compression-forming means according to the present invention.

FIG. 13 is a schematic view illustrating the compression-forming means 20 installed around the forming chamber 8. A cooling water line, along which cooling water circulates, is formed through the base plate 9 provided on the bottom of the forming chamber 8, the cooling plates 513, 325 and 335 of the preheating device 30, the cooling plate 45 of the compressing device 40, and the upper coolers of the cooling device 50.

Furthermore, the forming chamber 8 is filled with nitrogen ($N_2$), and nitrogen is continuously supplied into the forming chamber 8 during the lens manufacturing process.

The reason why nitrogen is supplied into the forming chamber 8 is that, because the lens manufacturing process is conducted at high temperature, it is necessary to prevent metal elements installed in the forming chamber 8 from oxidizing due to the high-temperature conditions.

Figure 14:
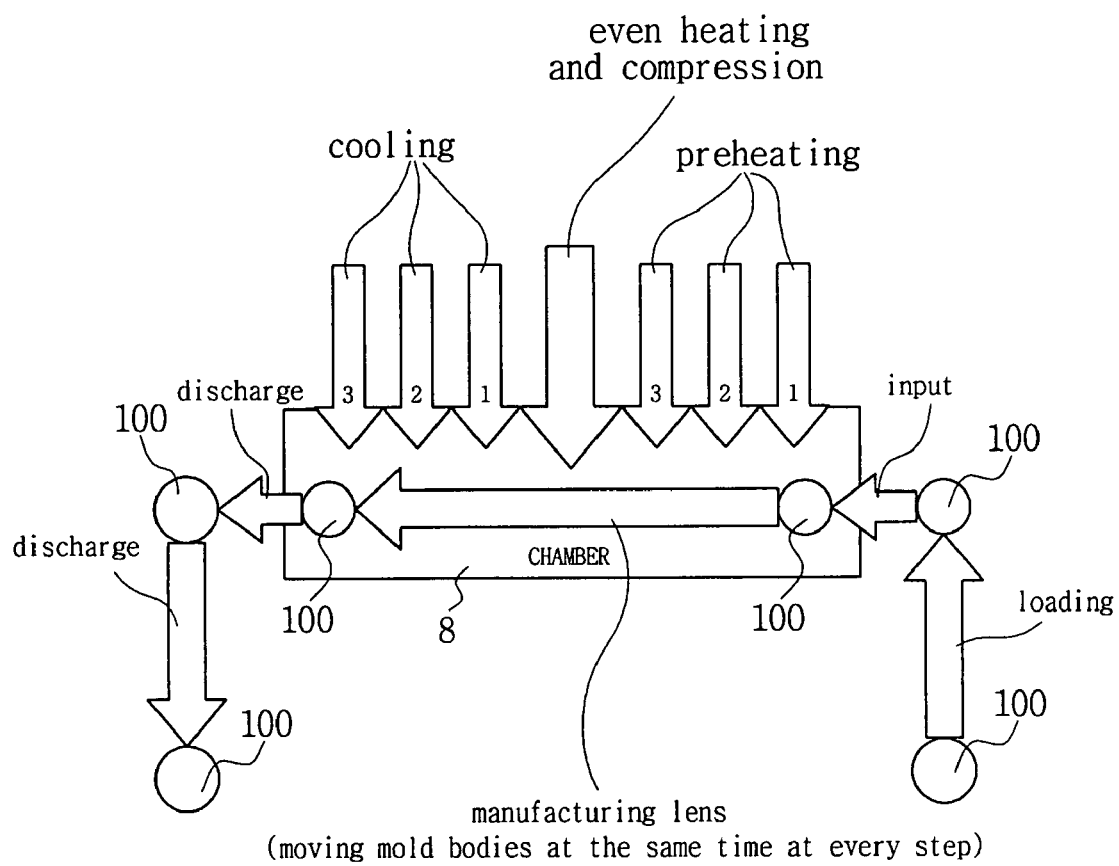
FIG. 14 is a view illustrating a process of manufacturing a multi-focus lens according to the present invention.

FIG. 14 is a view illustrating the cycle time of the lens manufacturing process according to the present invention.

It takes six seconds to move the mold body 100 to the loading plate 12 through the input conveyor 11 of the loading means 10. It takes four seconds to move the mold body 100 from the loading plate 12 to the first preheating position in the forming chamber 8 using the loading bar 14. It takes from 80 to 100 seconds to pass the mold body 100 through the preheating device 30, the compressing device 40 and the cooling device 50 in the forming chamber 8. It takes four seconds to move the mold body 100 from the forming chamber 8 to the discharge plate 81. It takes six seconds to discharge the mold body 100 outside the cabinet 1 through the discharge conveyor 84.

Although the single mold body 100 is illustrated as passing through the processes to show the time required to pass each process, because several mold bodies 100 are consecutively input into the forming chamber 8 in a real lens manufacturing process, multi-focus lenses can be manufactured at relatively high speed.

Figure 15:
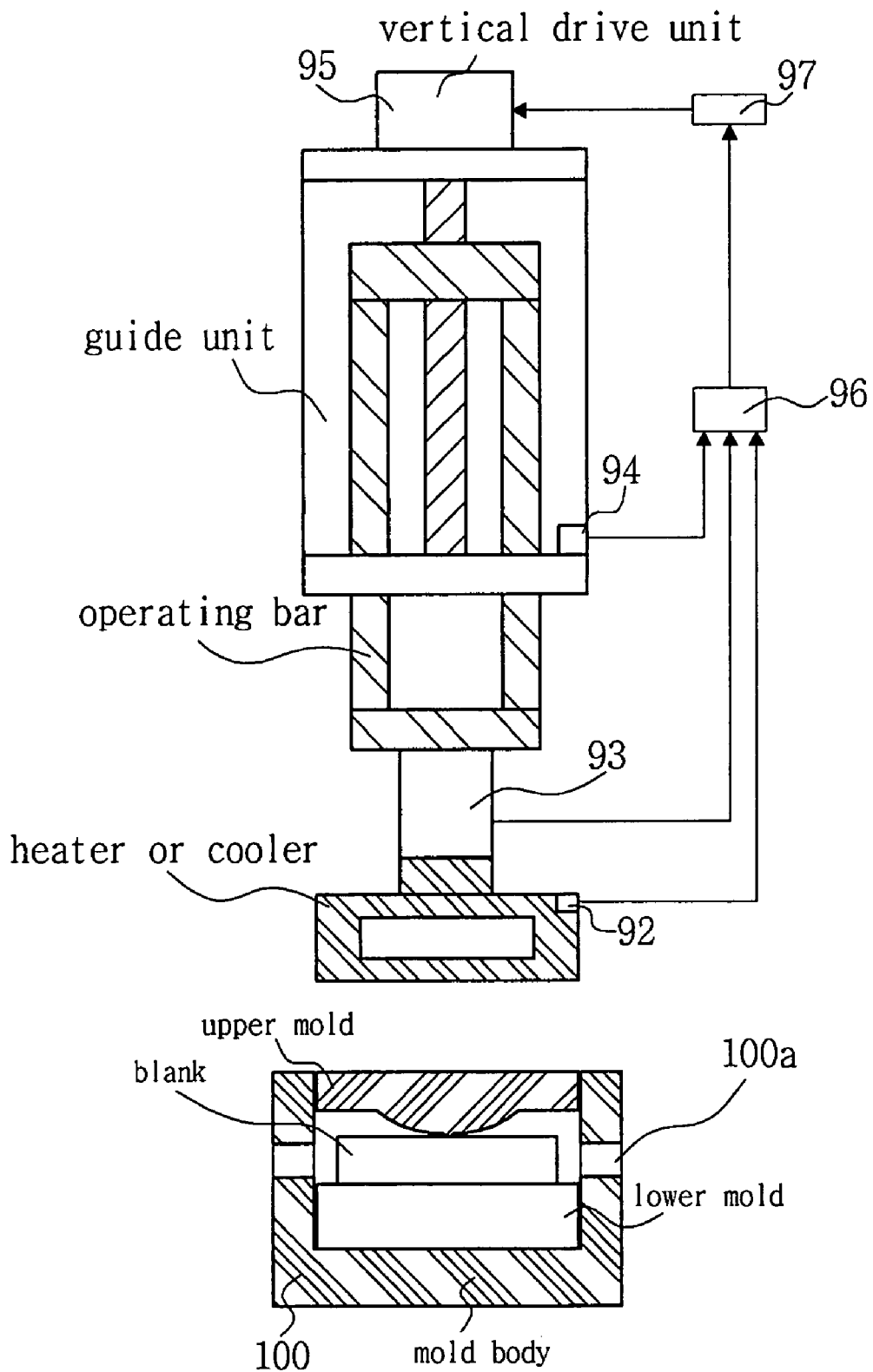
FIG. 15 is a view illustrating the compression-forming means and a control means therefor according to the present invention.

FIG. 15 illustrates an embodiment of the control means 90 required to automatically and precisely control the compression-forming means 20.

Referring to the drawing, the heater or cooler is provided under the lower end of each operating bar. The vertical drive unit for moving the operating bar is provided on the upper end of the operating bar. In the above embodiments, a motor 95 is used as the vertical drive unit. The motor 95 is precisely reversibly rotated by control voltage supplied from a motor drive unit 97.

Furthermore, the control means 90 includes a sensing means. The sensing means includes a position sensor 94, which is provided on the guide unit and detects the position of the operating bar, which is moved along the guide unit that ensures the vertical straightness of the operating bar, a pressure sensor 94, which is provided in the operating bar to detect compression force, and a temperature sensor 92, which is provided in the heater or cooler to detect the temperature of the corresponding element.

The control means 90 further includes the controller 96, which receives information about the position, pressure and temperature detected by the position sensor 94, the pressure sensor 93 and the temperature sensor 92 and precisely controls the angle at which the motor 95 is rotated, and the heating temperature of the heater or the temperature of supplied cooling water.

The controller 96 controls the heater such that the mold body 100 is maintained at a preset temperature, which is input by the user through the key panel 3 provided in the cabinet 1, and controls the vertical drive unit such that the mold body 100 is compressed at a pressure preset by the user and the blank is thus compressed in an appropriate state.

Furthermore, the controller 96 controls the position moving means 60 such that each mold body 100 is moved to the next process after the current process has been completed. As such, the controller 96 controls the elements such that the overall operation of the lens manufacturing apparatus is continuously conducted.

The control means 90, which conducts the above-mentioned operation, is installed in the cabinet 1.

Figure 17:
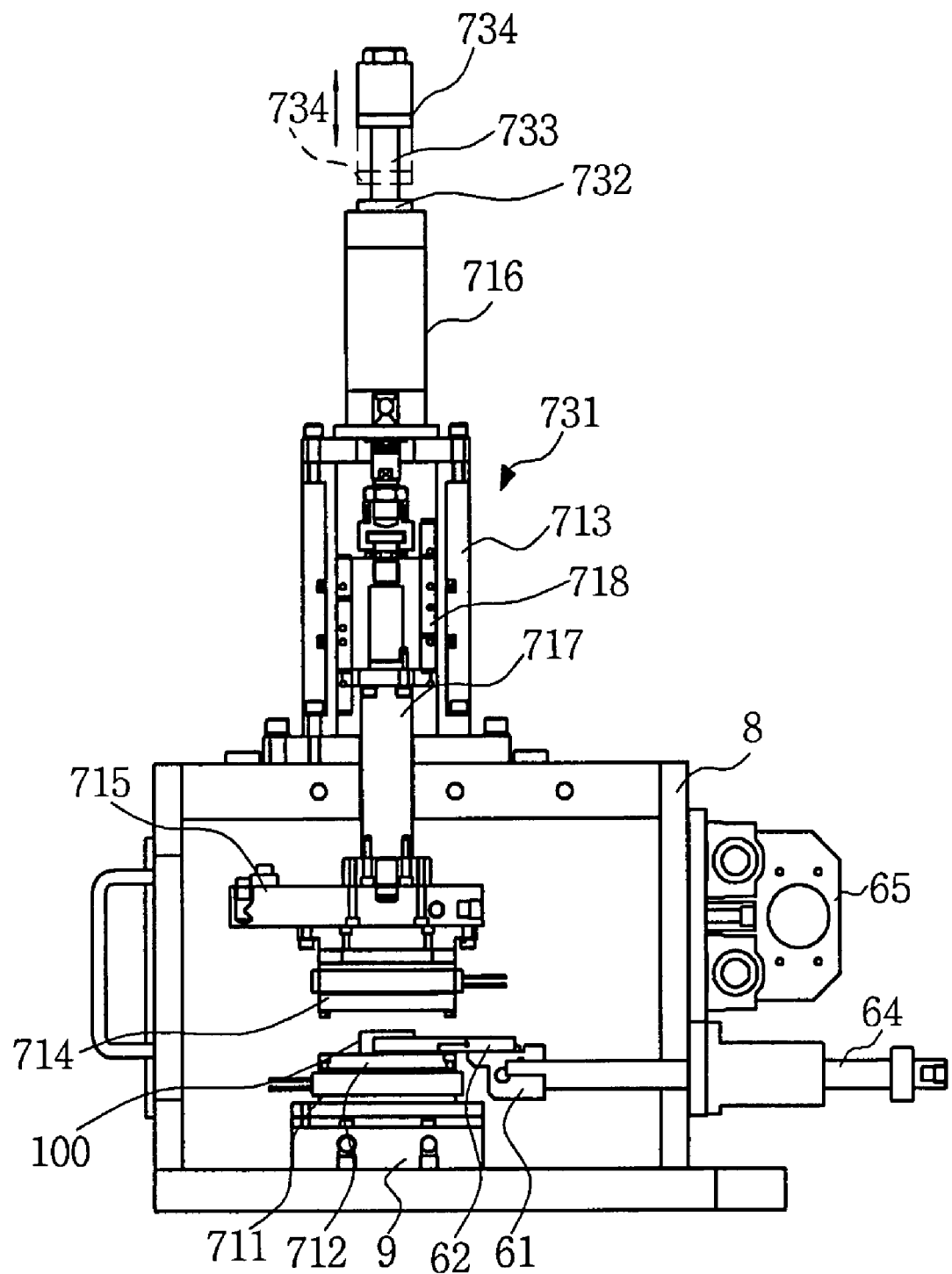
FIG. 17 is a side view showing another embodiment of the preheating device of the multi-focus lens manufacturing apparatus of the present invention.
Figure 18:
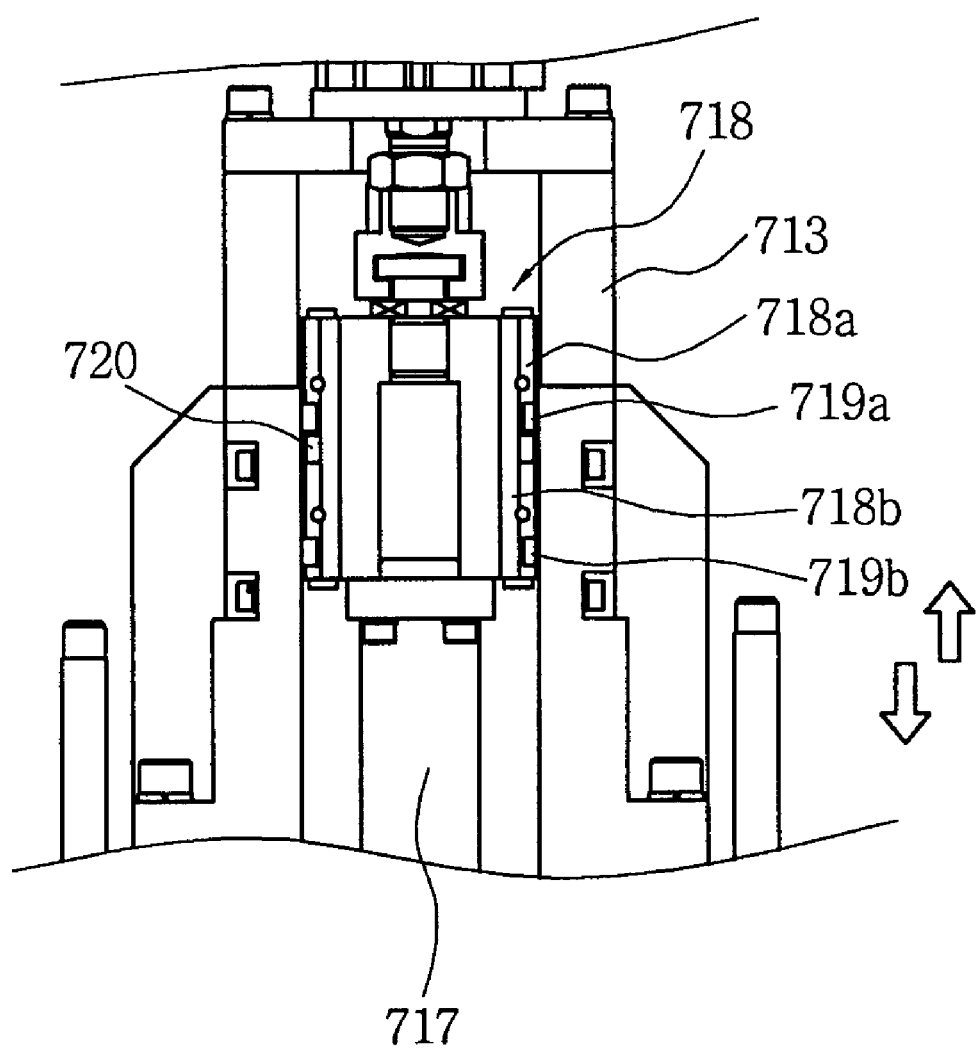
FIG. 18 is a view showing in detail a cross roller bearing of the preheating device according to the present invention.

FIGS. 17 and 18 illustrate another embodiment of the first through third preheating units 31 through 33 of the preheating device 30 according to the present invention.

Hereinafter, the general construction of the first through third preheating units 31 through 33 according to this embodiment will be described.

A lower heater 711 is placed on the base plate 9, which is provided on the bottom of the forming chamber 8. A thermal conduction plate 712, which is made of cemented carbide and evenly transfers heat from the lower heater 711 to the mold body 100, is layered on the lower heater 711.

Furthermore, a guide unit 713, which comprises an LM guide, is vertically provided on the forming chamber 8 at a position facing the thermal conduction plate 712. A vertical drive unit 716, which comprises a hydraulic cylinder and vertically moves an operating bar 717, is provided on the guide unit 713. The operating bar 717 coupled to the vertical drive unit 716 is linearly moved along the guide unit 713 in a vertical direction.

The lower end of the operating bar 717 is disposed in the forming chamber 8. As shown in the drawing, an upper heater 714 is provided under the lower end of the operating bar 717, such that the upper heater 714 moves downwards and heats the mold body 100 placed on the thermal conduction plate 712. A cooling plate 715 is provided between the upper heater 714 and the operating bar 717 to prevent heat from being transferred from the upper heater 714 to the upper portion of the first preheating unit 31 through the operating bar 717.

A plurality of heater rods, each of which has a heating coil wound around it, is installed in each of the lower heater 711 and the upper heater 714. A cooling water line, through which cooling water passes, is defined in the cooling plate 715.

Furthermore, the mold bodies 100, which have been preheated by the preheating units 31 through 33, are moved to the subsequent processing positions by the corresponding carrying arms 62 mounted to the horizontal arm 61. Here, the preheating units 31 through 33 preheat the mold bodies 100 at temperatures ranging from 300° C. to 600° C.

Meanwhile, in this embodiment, a first permanent magnet 732 is provided on the vertical cylinder 716. A second permanent magnet 734 is provided on an upper end of an operating rod 733, which protrudes from the upper end of the vertical cylinder 716. The first permanent magnet 732 and the second permanent magnet 734 are oriented such that like magnetic poles thereof face each other. Thus, when the operating rod 733 is moved downwards, repulsive force exists between the first and second permanent magnets 732 and 734.

Preferably, the repulsive force between the first and second permanent magnets 732 and 734 is set such that the load of the operating rod 733 is equal to or slightly less than the weight of the sum of the operating bar 717 and the upper heater 714 during the preheating process.

The reason for this is that, when the operating rod 733 is moved by its weight and the first and second permanent magnets 732 and 734 are thus adjacent to each other, the first and second permanent magnets 732 and 734 must not be in contact with each other due to the repulsive force, and, when the first and second permanent magnets 732 and 734 are not in contact with each other, the mold body 100 can be preheated by the upper heater 714 in the state in which a predetermined gap is maintained between the mold body 100 and the upper heater 714, without contact therebetween.

That is, in the prior embodiment, a problem in which the upper heater is excessively moved downwards during the preheating process and thus pushes the upper mold of the mold body 100 so that the shape of the blank is deformed may occur. However, in this embodiment, the lowermost position of the upper heater 714 can be maintained constant by the repulsive force between the first and second permanent magnets 732 and 734, thus preventing the blank from being deformed during the preheating process.

Furthermore, in the prior embodiment, because the upper heater preheats the mold body 100 in the contacted state, the mold body separating unit is required in order to prevent the mold body 100 from being moved upwards along with the upper heater when the upper heater is moved upwards after the preheating process has been completed. However, in this embodiment, because the upper heater 714 is not in contact with the mold body 100, a separate mold body separating unit is not required.

FIG. 18 shows in detail a cross roller bearing 718 provided between the guide unit 713 and the operating bar 717.

In detail, an upper stopper 719a and a lower stopper 719b are provided on a stationary part 718a of the cross roller bearing 718 at positions spaced apart from each other by a predetermined distance. A stop bolt 720, to be stopped by the upper and lower stoppers 719a and 719b, protrudes from the outer surface of a movable part 718b, which contacts the stationary part 718a and slides relative to the stationary part 718a.

Because the cross roller bearing 718 has the above-mentioned construction, the distance that the movable part 718b is moved is limited within a predetermined range. In addition, even if a worker tilts the guide unit 713 provided with the cross roller bearing 718 during a process of manufacturing the lens manufacturing apparatus, the cross roller bearing 718 and the operating bar 717 are prevented from being undesirably removed from the guide unit 713. Therefore, the production assembly process can be conducted more stably.

As described above, an apparatus for manufacturing a megapixel multi-focus lens according to the present invention includes a loading means, which supplies a mold body, in which a blank, interposed between upper and lower molds, is placed, to a forming position, a compression-forming means, which preheats, compresses and cools the supplied mold body such that the blank is formed into a multi-focus lens having an aspherical surface, and a discharge means, which discharges the multi-focus lens formed by the compression-forming means. Therefore, in the present invention, processes from loading to discharging can be automated, so that the productivity of the apparatus for manufacturing the multi-focus lens can be markedly enhanced. Furthermore, because the lens manufacturing apparatus is covered with a cabinet, a superior appearance thereof is ensured. In addition, various electric components for controlling the compression-forming means are provided in the cabinet, so that it is not necessary to separate electrical control parts from mechanical parts. As well, during the multi-focus lens manufacturing process, when a carrying arm moves the mold body to the next processing position, because the carrying arm is brought into line contact with the sidewall of the mold body, heat dissipation holes, which are formed through the sidewall of the mold body, are prevented from being closed. Thus, the lens formation ability of the lens manufacturing apparatus is enhanced. As well, the initial position of the carrying arm can be minutely and precisely adjusted depending on the size of the mold body. Moreover, in the present invention, a heat blocking plate is provided on the front surface of a forming chamber. Thus, a high heat in the forming chamber is prevented from radiating outside, therefore the productivity of a worker can be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for manufacturing a megapixel multi-focus lens, comprising:
   loading means, comprising an input conveyor to supply a mold body, in which a blank interposed between upper and lower molds is placed, to a loading plate, and a loading bar to supply the mold body, supplied to the loading plate, to a forming position;
   compression-forming means, comprising first through third preheating units to preheat the mold body to a predetermined temperature, a compressing unit to compress the preheated mold body at a preset pressure, and first through third cooling units to cool the compressed mold body through a plurality of steps, the first through third preheating units, the compressing unit, and the first through third cooling units being consecutively arranged in a line in a forming chamber and respectively preheating, compressing, and cooling the mold body in the forming chamber filled with nitrogen gas so that the blank is formed into the multi-focus lens having an aspherical surface;

position moving means for moving the mold body to a subsequent processing position in the forming chamber; and discharge means, comprising a discharge conveyor to discharge the multi-focus lens formed by the compression-forming means, wherein each of the first through third preheating units comprises a lower heater placed on a base plate provided on a bottom in the forming chamber, a thermal conduction plate made of cemented carbide and layered on the lower heater to transfer heat from the lower heater to the mold body, a guide unit vertically provided on the forming chamber, a vertical drive unit comprising a hydraulic cylinder or motor and provided on an upper end of the guide unit to vertically move an operating bar, and the operating bar, coupled to the vertical drive unit, the operating bar being linearly moved along the guide unit in a vertical direction, wherein an upper heater is provided under a lower end of the operating bar to move downwards, preheat, and compress the mold body placed on the thermal conduction plate, and wherein mold body separating means is provided both on a cooling plate, provided between the upper heater and the operating bar to prevent heat from being transferred from the upper heater to the operating bar, and on the upper heater to separate the mold body from the upper heater such that the mold body is prevented from being moved upwards along with the upper heater when the upper heater is moved upwards after moving downwards, and contacting the upper surface of the mold body, the mold body separating means comprising two vertical rods provided in respective opposite ends of the cooling plate so as to be movable in a vertical direction, a return spring fitted over each of the vertical rods to apply elastic force to the vertical rod in a direction in which the vertical rod is moved downwards, a separating bar coupling the two vertical rods to each other, the separating bar passing through a lower surface of the upper heater, and a seating groove formed in the lower surface of the upper heater, so that the separating bar is seated into the seating groove.

2. The apparatus for manufacturing the megapixel multi-focus lens as set forth in claim 1, wherein the compressing unit further comprises:

a measuring scale to measure a distance that the upper heater is vertically moved and to transmit the measured data to a controller of a control means, and a load cell, provided on an upper end of the operating bar, to detect a compression pressure of the vertical drive unit.

3. An apparatus for manufacturing a megapixel multi-focus lens, comprising:

loading means, comprising an input conveyor to supply a mold body, in which a blank interposed between upper and lower molds is placed, to a loading plate, and a loading bar to supply the mold body, supplied to the loading plate, to a forming position;

compression-forming means, comprising first through third preheating units to preheat the mold body to a predetermined temperature, a compressing unit to compress the preheated mold body at a preset pressure, and first through third cooling units to cool the compressed mold body through a plurality of steps, the first through third preheating units, the compressing unit, and the first through third cooling units being consecutively arranged in a line in a forming chamber and respectively preheating, compressing, and cooling the mold body in the forming chamber filled with nitrogen gas so that the blank is formed into the multi-focus lens having an aspherical surface;

position moving means for moving the mold body to a subsequent processing position in the forming chamber; and discharge means, comprising a discharge conveyor to discharge the multi-focus lens formed by the compression-forming means, wherein each of the first through third cooling units comprises a lower cooler placed on a base plate provided on a bottom in the forming chamber, a thermal conduction plate made of cemented carbide and layered on the lower cooler to supply cool air to the mold body and to thus cool the mold body, a guide unit vertically provided on the forming chamber, a vertical drive unit comprising a hydraulic cylinder or motor and provided on an upper end of the guide unit to vertically move an operating bar, and the operating bar coupled to the vertical drive unit, the operating bar being linearly moved along the guide unit in a vertical direction, wherein an upper cooler is provided under a lower end of the operating bar to move downwards and cool the mold body, placed on the thermal conduction plate, and a horizontal plate is provided between the upper cooler and the operating bar, and wherein mold body separating means is provided both on the horizontal plate and on the upper cooler to separate the mold body from the upper cooler such that the mold body is prevented from being moved upwards along with the upper cooler when the upper cooler is moved upwards after moving downwards and contacting the upper surface of the mold body, the mold body separating means comprising two vertical rods provided in respective opposite ends of the horizontal plate so as to be movable in a vertical direction, a return spring fitted over each of the vertical rods to apply elastic force to the vertical rod in a direction in which the vertical rod is moved downwards, a separating bar coupling the two vertical rods to each other, the separating bar passing through a lower surface of the upper cooler, and a seating groove formed in the lower surface of the upper cooler, so that the separating bar is seated into the seating groove.

4. An apparatus for manufacturing a megapixel multi-focus lens, comprising:

loading means, comprising an input conveyor to supply a mold body, in which a blank interposed between upper and lower molds is placed, to a loading plate, and a loading bar to supply the mold body, supplied to the loading plate, to a forming position;

compression-forming means, comprising first through third preheating units to preheat the mold body to a predetermined temperature, a compressing unit to compress the preheated mold body at a preset pressure, and first through third cooling units to cool the compressed mold body through a plurality of steps, the first through third preheating units, the compressing unit, and the first through third cooling units being consecutively arranged in a line in a forming chamber and respectively preheating, compressing, and cooling the mold body in the forming chamber filled with nitrogen gas so that the blank is formed into the multi-focus lens having an aspherical surface;

position moving means for moving the mold body to a subsequent processing position in the forming chamber; and discharge means, comprising a discharge conveyor to discharge the multi-focus lens formed by the compression-forming means, wherein each of the first through third preheating units comprises:

a guide unit comprising an LM (linear motion) guide and provided on the forming chamber;

a vertical cylinder comprising a hydraulic cylinder and provided on an upper end of the guide unit to vertically move an operating bar; and the operating bar being linearly moved along the guide unit in a vertical direction, wherein an upper heater is provided under a lower end of the operating bar to heat the mold body placed on the thermal conduction plate, a first permanent magnet is provided on an upper end of the vertical cylinder, and a second permanent magnet is provided on an upper end of an operating rod, which protrudes from the upper end of the vertical cylinder, such that like magnetic poles of the first and second permanent magnets face each other.

5. The apparatus for manufacturing the megapixel multi-focus lens as set forth in claim 4, wherein repulsive force between the first and second permanent magnets is set such that a load of the operating rod is equal to or slightly less than a weight of a sum of the operating bar and the upper heater during the preheating process.

6. The apparatus for manufacturing the megapixel multi-focus lens as set forth in claim 1, wherein a cross roller bearing is provided between the guide unit and the operating bar, and an upper stopper and a lower stopper are provided on a stationary part of the cross roller bearing at positions spaced apart from each other by a predetermined distance, and a stop bolt, to be stopped by the upper and lower stopper, protrudes from an outer surface of a movable part, which contacts the stationary part and slides relative to the stationary part.

7. The apparatus for manufacturing the megapixel multi-focus lens as set forth in claim 1, wherein the mold body comprises a plurality of mold bodies, and the position moving means includes a horizontal arm, and a plurality of carrying arms corresponding to a number of processes and extending forward from the horizontal arm to simultaneously move the mold bodies to subsequent process positions, with contact parts formed on an end of a surface of each of the plurality of carrying arms to define a notch having a shape such that the carrying arm is in line contact with the corresponding mold body, wherein each of the contact parts has a cross-section which is reduced in width from a proximal end thereof to a distal end thereof to have a shape similar to an isosceles triangle, and wherein a movable member coupled to the horizontal arm is provided on a rear surface of the forming chamber, a forward-backward cylinder is coupled to the movable member to move the horizontal arm forward and backward, and a leftward-rightward cylinder is provided on an end of the rear surface of the forming chamber to move the movable member leftward and rightward.

8. The apparatus for manufacturing the megapixel multi-focus lens as set forth in claim 7, wherein a null point setting unit is provided on the movable member to set initial positions of the carrying arms, and the null point setting unit is coupled at a first position thereof to the rear surface of the forming chamber and is coupled at a second position thereof to the movable member, and an adjustment nut is provided on one end of the null point setting unit and is manipulated by a user.

9. The apparatus for manufacturing the megapixel multi-focus lens as set forth in claim 1, wherein a radiant heat blocking plate is mounted to a front surface of the forming chamber to prevent heat generated in the forming chamber from being radiated forward from the forming chamber.

10. The apparatus for manufacturing the megapixel multi-focus lens as set forth in claim 3, wherein the lower cooler of the third cooling unit is provided on a separate support such that the mold body is placed on an upper surface of the lower cooler, and a height adjustment plate is removably provided under a lower surface of the support to adjust a height of the lower cooler.

11. The apparatus for manufacturing the megapixel multi-focus lens as set forth in claim 1, wherein the loading means, the compression-forming means, the position moving means, and the discharge means are installed in a cabinet having a predetermined shape, and a plurality of front doors is provided in a front surface of the cabinet, a side door is openably provided in a side surface of the cabinet, a monitor is provided in a top left hand corner of the front surface of the cabinet to indicate a general operating state of the lens manufacturing apparatus, and a key panel for inputting various control commands is provided below the monitor in the cabinet and is constructed as a drawer type structure.

* * * * *

UNITED STATES PATENT AND TRADEMARK OFFICE
CERTIFICATE OF CORRECTION

PATENT NO.       : 7,473,091 B2                                    Page 1 of 1
APPLICATION NO.  : 11/726704
DATED            : January 6, 2009
INVENTOR(S)      : Myung Sung Woo et al.

It is certified that error appears in the above-identified patent and that said Letters Patent is hereby corrected as shown below:

On the Title page, Item (73) Assignee "AEHO TECHNOLOGY CO. LTD," should read -- DAEHO TECHNOLOGY CO., LTD. --.

Signed and Sealed this

Eighteenth Day of August, 2009

David J. Kappos
*Director of the United States Patent and Trademark Office*